United States Patent
Liu et al.

(10) Patent No.: US 8,268,905 B1
(45) Date of Patent: Sep. 18, 2012

(54) COMPOSITIONS CONTAINING POLY(LACTIC ACID), BACTERIOCIN(S), PLASTICIZERS(S), AND OPTIONALLY PORE FORMING AGENT(S), AND METHODS OR MAKING

(75) Inventors: LinShu Liu, Wyncote, PA (US); David R. Coffin, Glenside, PA (US); Kevin B. Hicks, Malvern, PA (US); Zhonglin T. Jin, North Wales, PA (US)

(73) Assignee: The United States of America, as represented by the Secretary of Agriculture, Washington, DC (US)

( * ) Notice: Subject to any disclaimer, the term of this patent is extended or adjusted under 35 U.S.C. 154(b) by 329 days.

(21) Appl. No.: 12/583,110

(22) Filed: Aug. 14, 2009

Related U.S. Application Data

(60) Provisional application No. 61/189,039, filed on Aug. 18, 2008.

(51) Int. Cl.
*C08J 9/00* (2006.01)
(52) U.S. Cl. ............. 521/95; 521/97; 521/179; 521/182
(58) Field of Classification Search .................... 521/95, 521/97, 179, 182
See application file for complete search history.

(56) References Cited

U.S. PATENT DOCUMENTS

| | | | | |
|---|---|---|---|---|
| 5,405,887 | A | * | 4/1995 | Morita et al. .................. 521/179 |
| 5,437,918 | A | * | 8/1995 | Taniguchi et al. ............. 442/415 |
| 2006/0233985 | A1 | * | 10/2006 | Pockat et al. ................. 428/34.9 |
| 2008/0063828 | A1 | * | 3/2008 | Peng et al. ................... 428/64.4 |

FOREIGN PATENT DOCUMENTS

RU 2250831 * 4/2005

OTHER PUBLICATIONS

By Ariyapitipun et al., "Survival of Listeria monocytogenes Scott A on Vacuum-Packaged. Raw Beef Treated with polylactic Acid, Lactic Acid, and Nisin", J. Food Prot. vol. 63, No. 1, 2000, 131-136.*

* cited by examiner

*Primary Examiner* — Irina S Zemel
(74) *Attorney, Agent, or Firm* — John D. Fado; G. Byron Stover

(57) ABSTRACT

A composition containing poly(lactic acid), at least one bacteriocin (e.g., nisin, generally in the form of Nisaplin®), and at least one plasticizer (e.g., lactic acid, lactide, triacetin, glycerol triacetate), and optionally at least one pore forming agent. A method of making the composition, involving mixing about 100% of the total of the poly(lactic acid), about 50% to about 90% of the total of the at least one plasticizer, and optionally at least one pore forming agent at a first temperature of about 150° to about 170° C. to form a mixture, cooling the mixture to a second temperature of about 115° to about 125° C., adding at least one bacteriocin and about 10% to about 50% of the total of the at least one plasticizer and the remainder of the total of the poly(lactic acid) to the mixture and mixing to form the composition.

23 Claims, 24 Drawing Sheets
(6 of 24 Drawing Sheet(s) Filed in Color)

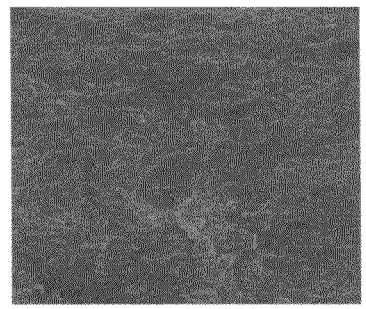
A
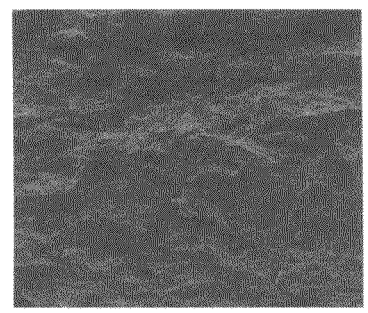
B
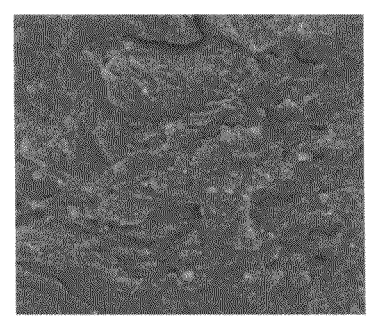
C
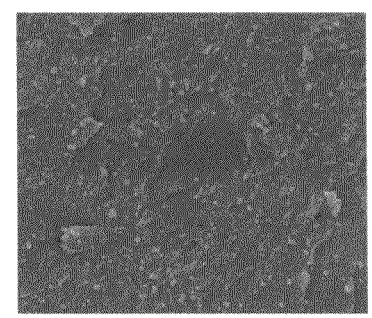
D
Figure 18A-D

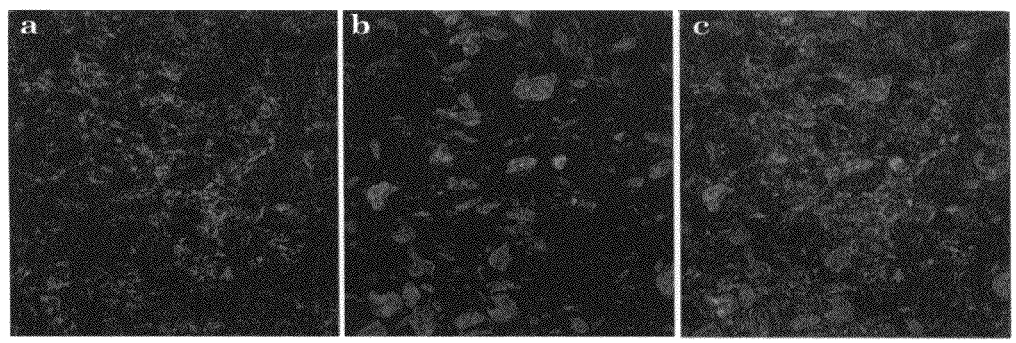
Figure 19A-C

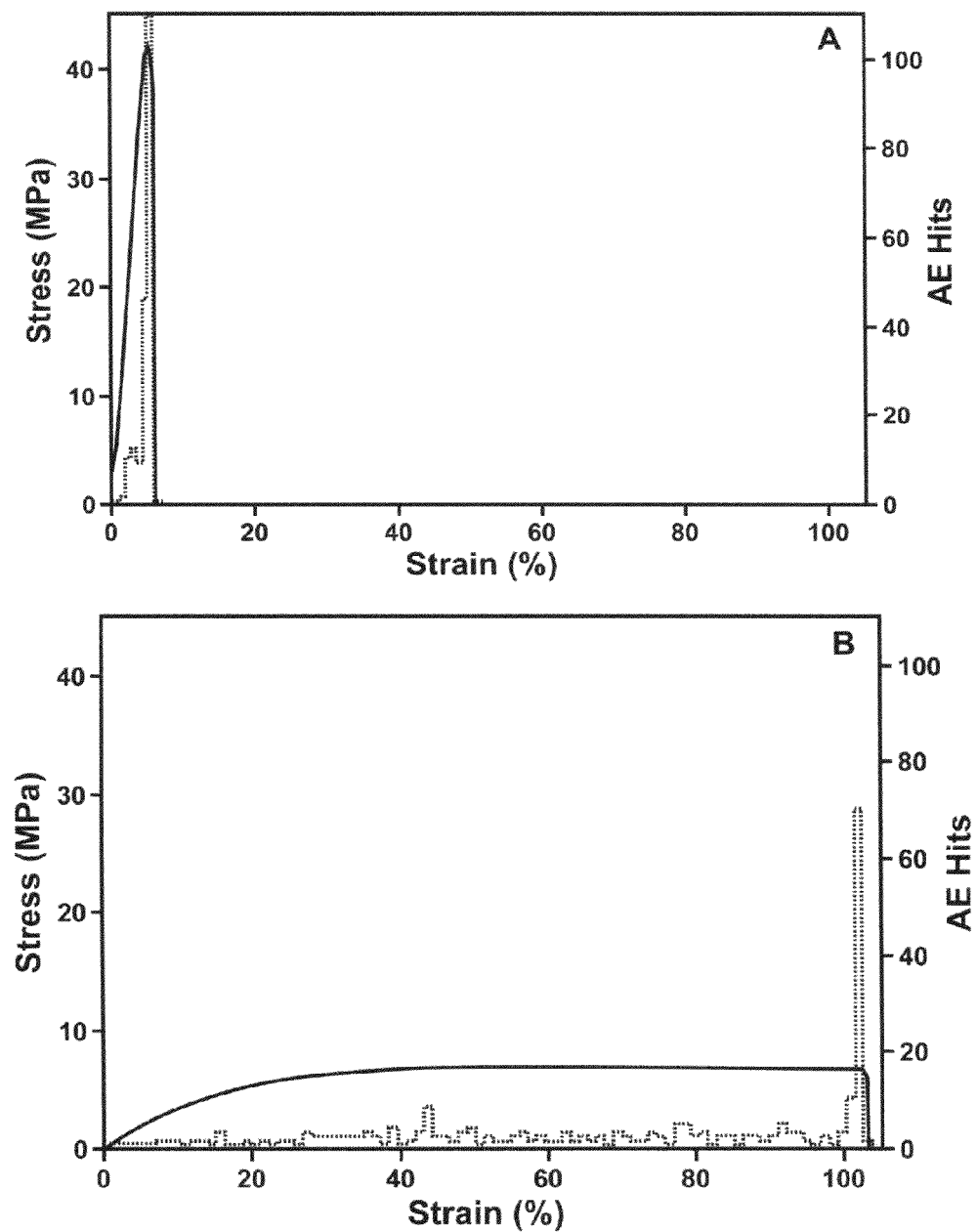
Figure 21A-B

COMPOSITIONS CONTAINING POLY(LACTIC ACID), BACTERIOCIN(S), PLASTICIZERS(S), AND OPTIONALLY PORE FORMING AGENT(S), AND METHODS OR MAKING

REFERENCE TO RELATED APPLICATION

This application claims the benefit of U.S. Provisional Application No. 61/189,039, filed 18 Aug. 2008, which is incorporated herein by reference in its entirety.

BACKGROUND OF THE INVENTION

The present invention relates to a composition containing poly(lactic acid), at least one bacteriocin (e.g., nisin, generally in the form of Nisaplin®), and at least one plasticizer (e.g., lactic acid, lactide, triacetin, glycerol triacetate), and optionally at least one pore forming agent. The present invention also relates to a method of making the composition, involving mixing about 100% of the total of the poly(lactic acid), about 50% to about 90% of the total of the at least one plasticizer, and optionally at least one pore forming agent at a first temperature of about 150° to about 170° C. to form a mixture, cooling the mixture to a second temperature of about 115° to about 125° C., adding at least one bacteriocin and about 10% to about 50% of the total of the at least one plasticizer and the remainder of the total of the poly(lactic acid) to the mixture and mixing to form the composition.

Nisin is a short chain antimicrobial polypeptide consisting of 34 amino acids. It is obtained from the culture of the food grade lactic acid bacteria *Lactoccocus lactis* subsp. *Lactis*. Nisin has demonstrated antimicrobial activity against a wide range of Gram-positive spoilage and pathogenic bacteria, and is the only bacteriocin approved for applications in food by the FDA (Cleveland, J., et al., Int. J. Food Microbiol., 71:1-20 (2001); Nisin preparation: affirmation of GAS status as a direct human food ingredient, Federal Register, 21 CFR Part 84, 1988, pp. 11241-011251). Currently, nisin is commercially available in a formulation containing 97.5% of milk solids and salts with the trade name Nisaplin®. Nisin, generally in the form of Nisaplin®, is popularly used in foods and beverages that are pasteurized but not fully sterilized, such as cheese, milk, and desserts. It is also used as a food preservative for meat and seafood (Calo-Mata, P., et al., Current applications and future trends of lactic acid bacteria and their bacteriocins for the biopreservation of aquatic food products, Food Bioprocess Technology, Springer, N.Y., 2007, Vol. 1, pp 43-63; Delves-Broughton, J., Food Australia, 57: 525-520 (2005); Stoyanova, L. G., et al., Applied Biochemistry and Microbiology, 43: 604-610 (2007); Sanjurio, K., et al., Food Research International, 39: 749-754 (2006)).

Nisaplin® can be applied to food by direct mixing with the foods, or by dipping the foods in Nisaplin® solutions. These methods may result in a rapid, on-site and on-time reduction of the bacterial population; however, these methods require a large amount of Nisaplin® and can not prevent the recovery of bacterial growth due to the short life time of Nisaplin® in foods. Alternatively, Nisaplin® can be incorporated into polymeric films that serve as food packaging which maintain food safety and quality, and prolong the shelf life of packaged foods. A variety of biobased materials has been used for this purpose, including chitosan, alginate, casein, cellulose derivatives, soybean proteins, zein, and animal derived proteins (Cha, D. S., et al., Lebens Wisse Technology, 35: 715-9 (2002); Kristo, E., et al., Food Hydrocolloids, 22: 373-86 (2008); Li, B., et al., Carbohydr. Polym., 65: 488-94 (2006); Millette, M., et al., Food Control, 18: 878-84 (2007); Xu, X., et al., Carbohydr. Polym., 70: 192-7 (2007)). Incorporation of Nisaplin® into petroleum derived thermoplastics such as poly(vinyl chloride) and low density polyethylene has also been studied in attempts to obtain antimicrobial films with higher tensile strength (Ming, X., et al., J. Food Sci., 62: 413-415 (1997); Siragusa, G. R., et al., Food Microbiology, 16: 229-235 (1999)).

Poly(lactic acid) (PLA) is a biodegradable thermoplastic produced from biobased precursors. PLA is easily processable and water resistant. Thin PLA membranes are good water vapor barriers and have relatively low gas transmittance, showing a high potential for packaging applications (Cutter C. N., Meat Science, 74: 131-142 (2006); Suyama, N. E., et al., J. Polym. and Env., 12: 1-6 (2004)). As previously reported, Nisaplin® could be incorporated into PLA by methods of diffusion, or by co-extrusion with the polyester following complexation with pectin, or by mechanical mixing in a PLA/$CH_2Cl_2$ solution, followed by film casting (Liu, L. S., et al., J. Appl. Polym. Sci., 106: 801-810 (2007); Jin, T., and H. Zhang, J. Food Sci., 73: M127-134 (2008)). Resultant PLA/Nisaplin® composites were antimicrobial. However, the processing was somewhat complicated and a large volume of organic solvent was also used in some cases. An ideal approach to prepare antimicrobial PLA membranes incorporating Nisaplin® is to co-extrude the two in one step, which would be simple, efficient, and could be easily handled for quality control and quality assurance. However, PLA melts at around 160° C.; while the maximal temperature at which nisin can retain its bioactivity is 120° C. Therefore, while nisin/PLA films could be prepared using one-step extrusion, the required temperatures for melting of the PLA during the process would result in films with little or no antimicrobial activity.

Thus there remains a need to produce PLA/bacteriocin (e.g., nisin) films at temperatures where the resulting films retain most or all of the antimicrobial activity of the bacteriocin.

SUMMARY OF THE INVENTION

In accordance with the present invention there is provided a composition containing poly(lactic acid), at least one bacteriocin (e.g., nisin, generally in the form of Nisaplin®), and at least one plasticizer (e.g., lactic acid, lactide, triacetin, glycerol triacetate), and optionally at least one pore forming agent. Also in accordance with the present invention, there is provided a method of making the composition, involving mixing about 100% of the total of the poly(lactic acid), about 50% to about 90% of the total of the at least one plasticizer, and optionally at least one pore forming agent at a first temperature of about 150° to about 170° C. to form a mixture, cooling the mixture to a second temperature of about 115° to about 125° C., adding at least one bacteriocin and about 10% to about 50% of the total of the at least one plasticizer and the remainder of the total of the poly(lactic acid) to the mixture and mixing to form the composition.

BRIEF DESCRIPTION OF THE DRAWINGS

The patent or application file contains at least one drawing executed in color. Copies of this patent or patent application publication with color drawing(s) will be provided by the Office upon request and payment of the necessary fees.

FIG. 18 shows SEM photographs of (A) PLA, (B) plasticized PLA, (C) plasticized PLA with EDTA, and (d) plasticized PLA with EDTA-Nisaplin® as described below.

FIG. 19 shows CLM images of plasticized PLA containing EDTA-Nisaplin® by confocal fluorescence for Nisaplin® (green) and confocal reflection for PLA (red) in two channels as described below.

DETAILED DESCRIPTION OF THE INVENTION

Figure 1:
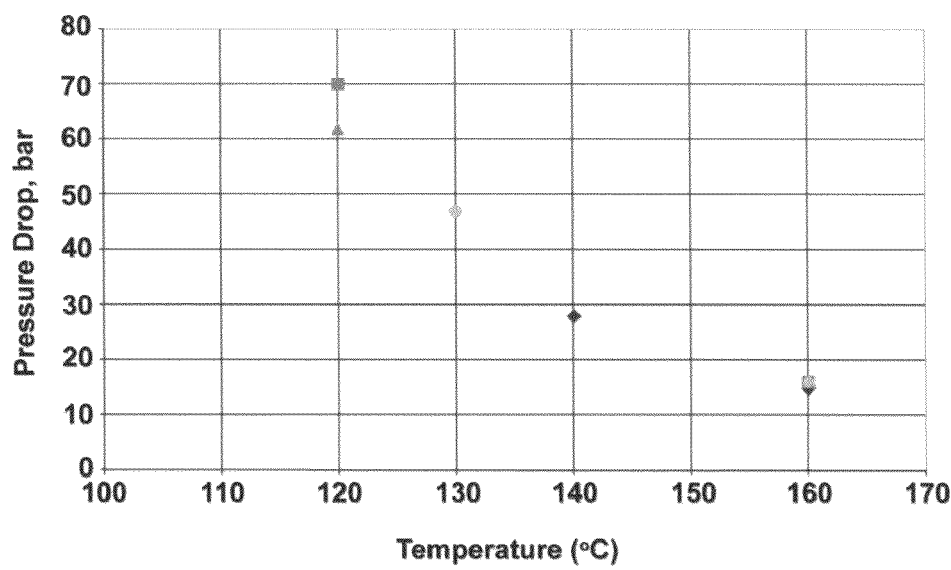
FIG. 1 shows value of pressure drop ΔP of PLA/LD (lactide) composites vs. operating temperature with LD content 20% as described below. Symbols with different shapes and colors indicated data obtained from different experiments

The present invention concerns a composition comprising about 70-about 95 wt % (e.g., 70-95 wt %) poly(lactic acid), about 0.1-about 5 wt % (e.g., 0.1-5 wt %) of at least one bacteriocin (e.g., nisin, generally in the form of Nisaplin®), and about 5-about 25 wt % (e.g., 5-25 wt %) of at least one plasticizer (e.g., lactic acid, lactide, triacetin, glycerol triacetate), and optionally about 2-about 15 wt % (e.g., 2-15 wt %) of at least one pore forming agent.

Generally the composition is produced by mixing, generally in an extruder, poly(lactic acid) and at least one plasticizer and optionally at least one pore forming agent at a temperature of about 150°-about 170° C. (e.g., 150°-170° C.) for about 2-about 4 minutes (e.g., 2-4 minutes; preferably about 3 minutes (e.g., 3 minutes)) to form a mixture; generally about 100% (e.g., 100%) of the total PLA and about 50%-about 90% (e.g., 50%-90%)) of the total plasticizer(s) in the composition are added in this step. The mixture is cooled, generally in an extruder, to a temperature of about 115°-about 125° C. (e.g., 115°-about 125° C.; preferably about 115°-about 120° C. (e.g., 115°-about 120° C.)). Then at least one bacteriocin (e.g., nisin, generally in the form of Nisaplin®) is added to the mixture (generally about 10%-about 50% (e.g., 10%-50%) of the total plasticizer(s) in the composition are added in this step; some of the PLA may be added in this step), followed by mixing for about 1-about 3 minutes (e.g., 1-3 minutes; preferably about 2 minutes (e.g., 2 minutes)), and generally extruded to form a film. As noted above, nisin is deactivated at temperatures over 120° C.; surprisingly, at a temperature only a few degrees higher than 120° C. for a short period (a few minutes) the degradation rate is relatively low, so on the time scale of the extrusion there should be relatively little degradation of the nisin within the temperature range of 115-125° C. Other compounds may be added to the composition such as sodium chloride. The extruder is generally operated at a pressure of 0-about 200 bar (e.g., 0-200 bar) and at a rpm of about 25-about 360 (e.g., 25-360). A film could be produced from the melted polymer blend or the melted polymer blend could be forced into a cavity mold of the desired configuration. Thus the melted polymer blend can be processed into films using an extruder die or compression molded or injection molded into a molded article.

Typical composition of Nisaplin® is about 2.5% nisin (e.g., 2.5%), about 77.5% sodium chloride (e.g., 77.5%), about 12% protein (e.g., 12%), about 6% carbohydrate (e.g., 6%), and about 2% moisture (e.g., 2%).

The pore forming agent include those materials which are capable of forming pores in the composition, including salts (e.g., alkali metal salts such as NaCl), polysaccharides (e.g., pectin), monosaccharides (e.g., sucrose), vitamins (e.g., vitamin C), or mixtures thereof.

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are now described.

The following examples are intended only to further illustrate the invention and are not intended to limit the scope of the invention as defined by the claims.

EXAMPLES

Example 1

Materials: PLA was obtained from Dow Cargill (Minneapolis, Minn.). The weight-average and number-average molecular weights were 148,000 and 110,000 respectively; the glass transition temperature ($T_g$) was 55°-60° C. according to the provider. Lactic acid (LA) and lactide (LD) were obtained from Fisher Science (Fair Lawn, N.J.). Nisaplin® (containing 2.5% nisin) was purchased form Danisco Cultor USA (New Century, Kans.). Glycerol triacetate (triacetin) was obtained from Sigma-Aldrich (St. Louis, Mo.). Deionized water (D.I. water) was prepared using a Barnstead™ E-pure™ water system (Dubuque, Iowa) and used as the medium for controlled release study.

PLA/Nisaplin® membrane preparation: PLA/Nisaplin® complexes in the form of strands or thin membranes were prepared using a HAAKE MiniLab II Rheomex CTW5 bench top twin-screw extruder (ThermoFisher Scientific, Waltham, Mass.). The extruder employed two co-rotating conical screws (109.5 mm in length, and 5 and 14 mm in diameter at the die and rear ends respectively), and had a bypass channel which allowed materials to be recycled or extruded through the use of a "cycle/flush" valve. The back channel was constructed as a rheological slit capillary with two pressure sensors, which provide rheological information about the flow behavior of the sample. The extruder was controlled by either an attached work station or with a computer and operation/analysis software (version 4.1.7, Polylab Monitor Software).

Complexes were prepared in a two step procedure. In the first step, 4.625 grams of PLA and 0.625 grams of LA, was added to the extruder using a pneumatic feeder. The operational temperature was set at 160° C. and the unit was set to recycle mode. After the PLA was melted, the barrel temperature was then reduced to 120° C. When this temperature was reached, the rest of the materials, 0.2 grams of LA and 0.055 gram of Nisaplin®, were added and the extrusion was continued. Membranes were prepared using a slit die that was 5 mm wide×0.5 mm high. For some experiments, particles of sodium chloride, used as pore-forming reagent, were added to the formulation together with PLA. The content of Nisaplin® was 1 wt % of total mass.

Differential Scanning calorimetry Analysis: Differential scanning calorimetry (DSC; Perkin Elmer Pyris 1, Norwalk, Conn.) was performed on the extruded specimens. The samples were crimp sealed in 40-µL aluminum pan. All samples were scanned from 0° to 180° C. at the heating rate of 10° C./min to examine the glass transition temperature and crystallinity of PLA in the test specimens. The instrument was purged with nitrogen.

Scanning Electron Microscopy Examination: A scanning electron microscope (SEM; Quanta 200 FEG, FEI, Hillsboro, Oreg.) was used to characterize the structural features of the extruded samples, such as phase distribution and microstructure of the fracture surfaces. Topographical images were obtained with high-vacuum/secondary electron-imaging mode. Samples were mounted on a specimen stub and sputtered with a thin layer of gold prior to examination. Images were collected at magnifications of 250× and 2,500×.

Antimicrobial Assay: Agar diffusion assay was used to determine the capability of Nisaplin® (both incorporated and in free form) for suppressing/inhibiting the growth of a bacterial strain. In the present study, the pathogenic bacteria *L. monocytogenes* Scott A 724 used for stock cultures was obtained from our in-house culture collection. Stock cultures were maintained at −80° C. in Brain Heart Infusion (BHI) broth (Difco Laboratory, Detroit, Mich.). Working Cultures of *L. monocytogenes* were maintained on BHI agar at 4° C. and were sub-cultured bi-weekly and grown aerobically at 37° C. in BHI broth. Prior to inoculation of product, cultures were grown in BHI broth at 37° C. for 16-18 h.

A glass test tube containing a piece of testing specimen (0.18~0.20 g) was filled with 9 ml of BHI broth and inoculated with 1 ml of an overnight culture of *L. monocytogenes* (approximately $1\times10^3$ cells). The test tubes were shaken at 150 rpm at 22° C. At two time points, one at the beginning of the experiment and another at 24 h post experiment, aliquots containing 1 ml of incubated sample were serially diluted with sterile phosphate buffer (Hardy Diagnostics, Santa Maria, Calif.), then pour plated onto BHI agar. Plates were incubated at 37° C. for 24 h before counting the colony forming units (CFU).

Effect of Nisaplin® Release on Membrane's Properties: The membranes were immersed in D.I. water (200 mg in 10 ml, solid/liquid) at room temperature with frequent and gentle shaking. At a designed time point, the membranes were taken out, rinsed with fresh D.I. water 3 times (5 ml for each time), and then vacuum-dried at room temperature for 24 hours. The topographic images and antimicrobial activity of the dried specimens were investigated by the methods described above.

Results and discussion: Table 1 shows the effect of LA on the rheological behavior of PLA under processing conditions. The values of torque and ΔP are measures of the resistance of PLA to screw rotation and the pressure drop along the slit capillary respectively, both reflecting the viscoelastic properties of the sample. The higher the value, the more elastic the samples are. These values are a function of composition and operating temperature. Without the addition of LA, PLA samples exist as a melt at 160° C.; however, when the temperature was reduced to 120° C. the values of torque and ΔP increased dramatically. At 120° C., the PLA was no longer in melt status and could not be extruded. With the addition of 10% LA, the PLA/LA composites surprisingly exhibited lower values of torque and ΔP at both 160° C. and 120° C. Although these values were increased when the temperature decreased from 160° C. to 120° C., the samples were viscous rather than elastic, and therefore surprisingly could be extruded. It was also noted that when the LA content was too high (e.g., 20%), the samples had too low of a viscosity to handle (data not shown); therefore, an appropriate LA content is necessary (generally about 7.5-15 wt % (e.g., 7.5-15 wt %) of LA). The effect of LD on the rheological properties of PLA was also examined, as shown in FIG. 1. For the PLA composites with 20% LD, the values of torque decreased as the temperature increased, and the value at 120° C. was surprisingly low enough to be extruded. The inclusion of other plasticizers to PLA, such as TA (triacetin), also surprisingly reduced the viscosity of the samples when extruded at 120° C. (data not shown).

Figure 2:
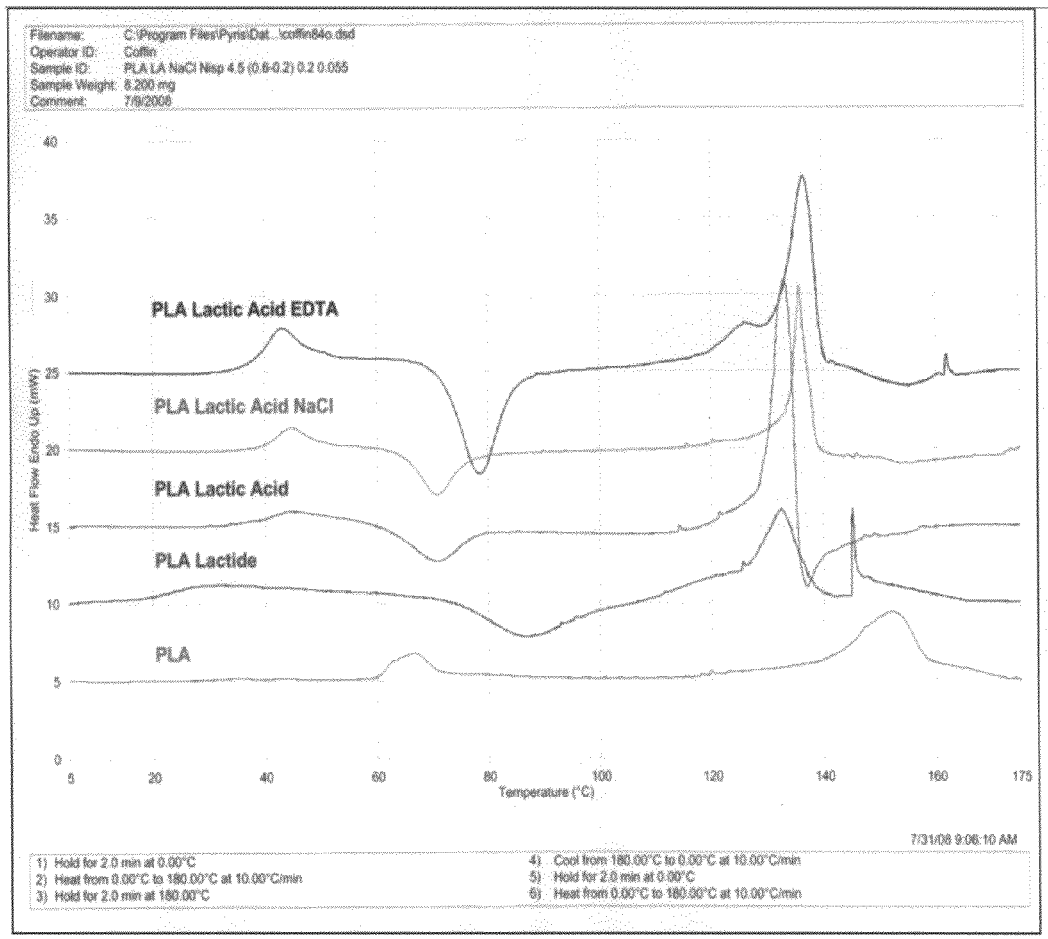
FIG. 2 shows DSC (Differential scanning calorimetry) thermograms of PLA plasticized with LA (lactic acid), LD and salts as described below.

The thermal behaviors of the extruded membranes were further analyzed by DSC. The results were summarized in FIG. 2 and Table 2. The poly(lactic acid) used in the present study was found to have a glass transition at 60° C. and a melting transition at 152° C. The addition of 20% LD surprisingly lowered these to 25° C. and 132° C. respectively. The addition of 10% LA surprisingly resulted in values of 41° C. and 133° C. for these transitions. A small increase in the melting temperature was seen when 20% of the lactic acid (3.6% of the total weight) was replaced with either NaCl or EDTA (data not shown). In addition to the decrease in the maximum of the melting transition, surprisingly the peak broadened toward lower temperatures with the additives and the onset of the transition was lowered significantly. Each of the four samples containing an additive also surprisingly showed the presence of a significant exotherm between 70° C. and 90° C. Without being bound by theory, this is presumably evidence of some reaction or recrystallization of the material. The DSC results were consistent with the finding obtained during the extrusion process (Table 1).

The extruded samples were evaluated for morphology and antimicrobial activity. The compositions of these samples are shown in Table 3. Since the PLA based packaging materials may be used for aqueous containers, such as bottles or cans of fruit juices and beverages, the efficacy of incorporated Nisaplin® may depend on their sustained release. Therefore, we added sodium chloride as a pore-forming reagent to the formulation and evaluated the effect of incubation time of the membranes on their antimicrobial activity.

Figure 3:
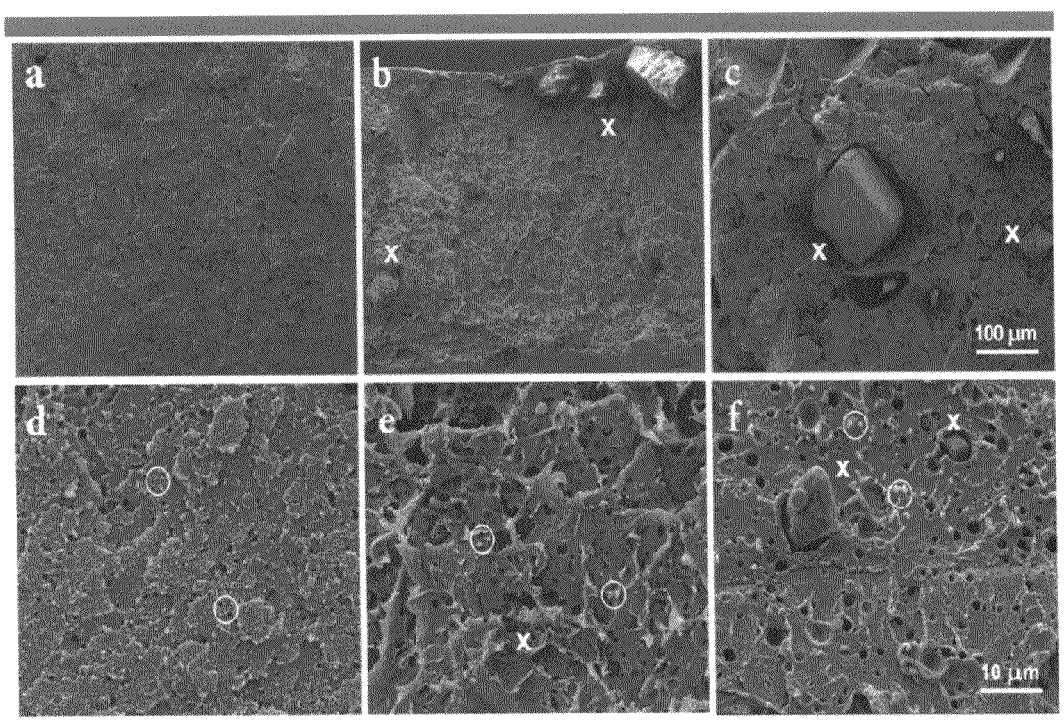
FIG. 3 shows SEM images of freeze-fractured PLA/LA/Nisaplin®/NaCl composite membranes as described below. The contents of pore-forming material, NaCl: 0% (a, d); 5% (b, e); and 15% (c, f). Particles of Nisaplin® (○) and NaCl (X). Field width: 540 μm (a, b, c); 54 μm (d, e, f).

The freeze-fractured structures of freshly extruded membranes are shown in FIG. 3. All membranes were heterogeneous, showing a craggy fractured surface. Furthermore, there were evenly distributed Nisaplin® microparticles embedded in the PLA phase. The introduction of Nisaplin® also created pores with size at around 2 μm. Without being bound by theory, presumably some heat sensitive components in Nisaplin® might have degraded and "evaporated" at higher temperature and under higher pressure during extrusion, therefore pores were created and particles were segregated. For samples prepared from co-extrusion with sodium chloride, the salt particles could be clearly identified. They were randomly spread within the PLA matrix. Furthermore, more pores were found in the salt-containing composites. Without being bound by theory, the pores were possibly created by the air that adhered on the irregular surfaces of the salt particles. The air was separated from the carriers during extrusion, concentrated to form bubbles under the pressure by the rotating of the twin-screw, and then escaped, leaving void spaces. The number of pores increased with the increase in salt content.

Figure 4:
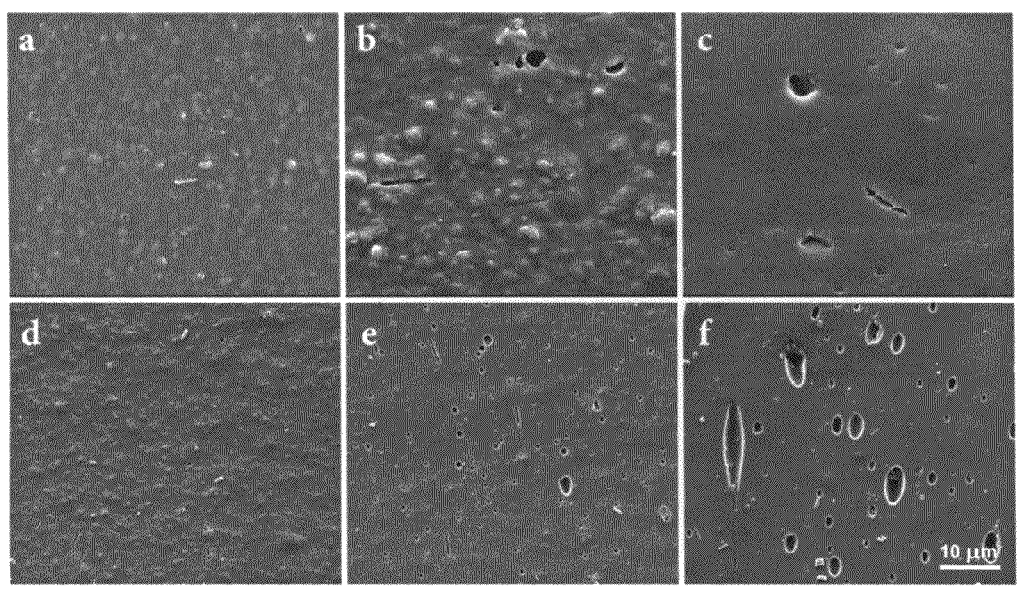
FIG. 4 shows SEM topographic images of PLA/LA/Nisaplin®/NaCl composite membranes after incubation with D.I. at room temperature for 2 weeks (a-c) and 6 weeks (d-f) as described below. NaCl content: 0% (a, d); 5% (b, e); and 15% (c, f). Field width: 54 μm.
Figure 5:
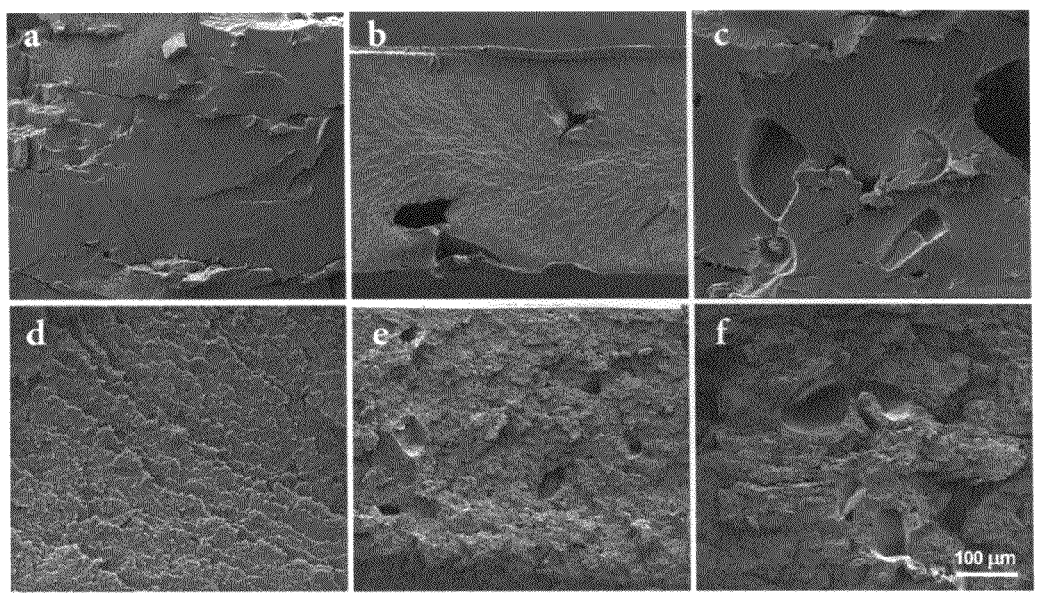
FIG. 5 shows SEM images of freeze-fractured PLA/LA/Nisaplin®/NaCl composite membranes after incubation with D.I. at room temperature for 2 weeks (a-c) and 6 weeks (d-f) as described below. NaCl content: 0% (a, d); 5% (b, e); and 15% (c, f). Field width: 540 μm.

The topographic images of the water-treated specimens are shown in FIG. 4. Bulk degradation may be the mechanism by which the degradation of PLA in aqueous solutions occurred randomly along with the macromolecular chains at edges or defects of the membrane surfaces. As a result, a rough morphology was created (FIG. 4). Embedded salt particles released as the water migrated, generating pores. With the increase in incubation time and/or salt content, the size of pores and the number of pores also increased. Similar results are also shown in FIG. 5 which describes the freeze-fractured structure of the composite samples. As the membrane degraded and pores were created, one can reasonably believe that the incorporated Nisaplin® gradually leached out, consequently the antimicrobial activity of the membrane should be simultaneously decreased. To examine this presumption, the capability of the composite membrane in suppressing *L. monocytogenes* growth was investigated after water treatment.

Figure 6:
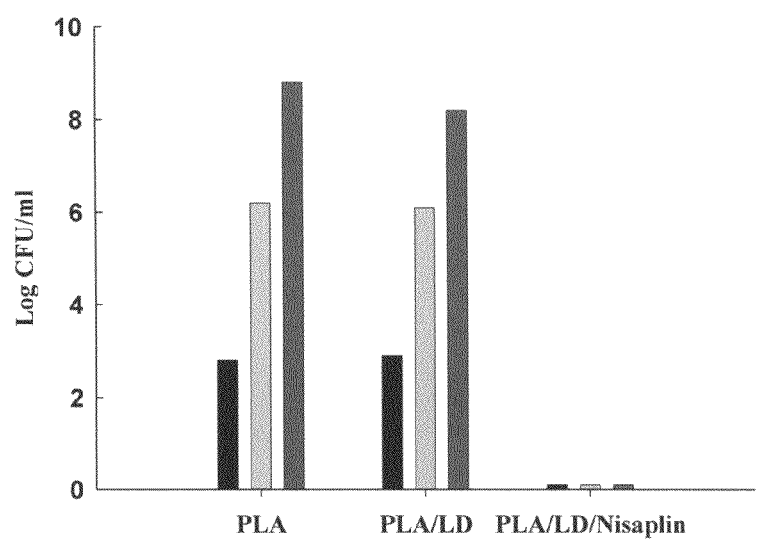
FIG. 6 shows growth of *Listeria monocytogenes* in BHI broth in the presence of the membranes of PLA, PLA/LD, and the membranes containing PLA/LD and Nisaplin® at room temperature as described below. For each type of membrane, the column (from left to right) stands for value of bacterial growth at the time when transferred to the agar, and after incubation for 24 and 48 hours, respectively.

FIG. 6 shows antimicrobial activity of pure PLA membranes and that of PLA membranes prepared by coextrusion with LD and Nisaplin®. Bacterial growth could be surprisingly prevented in BHI broth inoculated with *L. monocytogenes* in the presence of PLA membrane containing LD and Nisaplin®. Furthermore, surprisingly no bacterial recovery could be detected after culture for 24 and 48 hours, demonstrating significant antimicrobial activity of the Nisaplin® co-extruded with PLA and LD under present experimental conditions. In contrast, bacteria grew in BHI containing PLA membranes and PLA/LD membranes that did not contain Nisaplin®, and continued growing after culture for 24 and 48 hours.

Figure 7:
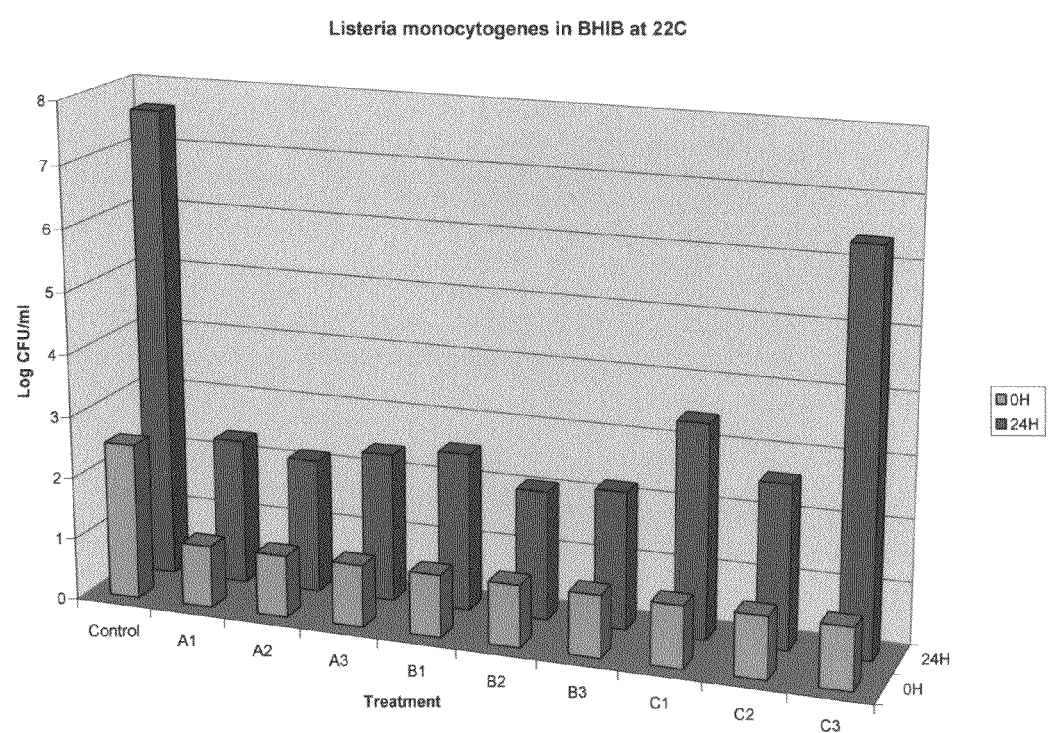
FIG. 7 shows growth of *Listeria monocytogenes* in BHI broth in the presence of the membranes of PLA, PLA/LA, and the membranes containing PLA/LA and Nisaplin®, and salts at room temperature at the time when transferred to agar (blue) and 24 hours after incubation (red) as described below. Columns from left to right: Control: PLA; A1, A2, A3: PLA/Nisaplin®, PLA/Nisaplin®/5% NaCl, and PLA/Nisaplin®/15% NaCl, all were stored at 4° C. for 4 weeks; B1, B2, and B3: PLA/Nisaplin®, PLA/Nisaplin®/5% NaCl, and PLA/Nisaplin®/15% NaCl, all were stored at room temperature for 4 weeks; C1, C2, and C3: PLA/Nisaplin®, PLA/Nisaplin®/5% NaCl, and PLA/Nisaplin®/15% NaCl, all were immersed in D.I. water for 4 weeks.

Membranes prepared by co-extrusion of PLA, LA and Nisaplin® also surprisingly showed excellent antimicrobial activity by suppressing the growth of *Listeria monocytogenes* (FIG. 7). The storage conditions (e.g., temperature) on the antimicrobial activity of membranes could be ignored. Furthermore, the inclusion of a pore creating reagent, such as sodium chloride could surprisingly accelerate Nisaplin® release, and thus improve the short term antimicrobial activity but reduce its life time.

We have thus shown that antimicrobial membranes of PLA and nisin can be prepared simply by co-extrusion with Nisaplin® in the presence of plasticizers, such as LA, LD, or TA at low temperature (e.g., 120° C.). The resultant membranes should be useful for antimicrobial packaging, such as used as the inner layer of multiple-layer packaging materials.

Example 2

Materials: PLA for membrane preparation was obtained from Cargill Dow (Minneapolis, Minn.) and stored at room temperature in sealed double-layered PVC bags. The weight-average molecular ($M_w$) weight and number-average molecular weights ($M_n$) of the PLA were 148,000 and 110,000 respectively. The PLA possessed a melting temperature ($T_m$)

of 155-160° C. and a glass transition temperature ($T_g$) of 55-60° C., according to the provider. Lactic acid (LA) and lactide (LD) were obtained from Fisher Scientific (Fair Lawn, N.J.). Glycerol triacetate (GTA), sodium chloride, vitamin C, and tetrahydrofuran (THF) were purchased from Sigma-Aldrich (St. Louis, Mo.). Nisaplin® (containing 2.5% nisin) and pectin were obtained from Danisco Cultor USA (New Century, Kans.). Sugar of sugar cane, fat-free milk, and 100% orange juice were purchased from a local grocery store. Deionized water (D.I. water) was prepared using a Barnstead E-pure water system (Dubuque, Iowa) and used as the medium for controlled release studies.

PLA/Nisaplin® Membrane Preparation: PLA/Nisaplin® complexes in the form of strands or thin membranes were prepared using a HAAKE MiniLab II Rheomex CTW5 bench-top twin-screw extruder (ThermoFisher Scientific, Newington, N.H.). The extruder employed two co-rotating conical screws (109.5 mm in length, and 5 and 14 mm in diameter at the die and rear ends, respectively), and had a bypass channel which allowed materials to be either recycled or directly extruded through the use of a "cycle/flush" valve. The back channel was constructed as a rheological slit capillary with two pressure sensors which provided rheological information about the flow behavior of samples. The extruder was controlled by either an attached work station or with a computer and operation/analysis software (version 4.1.7, Polylab Monitor Software).

PLA and a designated amount of plasticizers were mixed mechanically in a glass vial. A fraction of the mixtures was first added to the extruder using a pneumatic feeder. The extrusion was operated at 160° C. at the beginning, with the unit set to recycle mode. After the PLA was melted, the barrel temperature was then set to 120° C. When this temperature was reached, the rest of the mixtures with Nisaplin® (5 w % of total mass) was added and the extrusion was continued. Membranes were prepared using a slit die that was 5 mm in width and 0.5 mm in thickness.

For the samples prepared for controlled release studies, particles of sodium chloride, pectin, sugar or vitamin C, used as pore-forming reagents, were added to the formulations together with PLA and the plasticizers in the first loading.

Measurement of PLA Molecular Weight: The MW of PLA before and after extrusion was determined by gel permeation chromatography (GPC) using a Shimadzu chromatograph (LC-10AD, Kyoto, Japan) as described previously (Chen, F., et al., Ind. Eng. Chem. Res., 47: 8667-8675 (2008)). Prior to chromatography, specimens of each sample, about 1 g, were placed in a gastight glass vial containing 10 ml THF. The vials were shaken at room temperature for at least 32 hours to completely dissolve the PLA. The supernatant was pipetted off and analyzed. The chromatograph was equipped with a Phenogel column (GP/4446; 300 mm×7.8 mm) and a Phenogel guard column (22824G; 50 mm×7.8 mm) from Phonomenex (Torrace, Calif.), a refractive index detector (RID-10A), and a SCL-10A data station. THF was used as the mobile phase. The measurements were conducted at the flow rate of 1.0 ml/min at room temperature. For the calibration curve and MW calculation, the Mark-Houwink constants for PLA of K=5.450020×10$^{-3}$ and a=0.73 were used. A set of polystyrene samples was used as standards.

Differential Scanning calorimetry Analysis: Differential scanning calorimetry (DSC) was performed on the extruded specimens using a Perkin Elmer Pyris 1 (Norwalk, Conn.). The samples, 5-20 mg, were crimp sealed in 40-µL stainless steel pans. The instrument was purged with nitrogen. All samples were equilibrated at 0° C. for 2 minutes, heated to 180° C. (or 240° C.) at 10° C./min, and then rapidly cooled to 0° C. It was then equilibrated for 2 to 5 minutes depending on the maximum temperature used, and again heated to the maximum temperature at 10° C./min. Peak temperatures and peak areas were determined using the instrument software.

Mechanical Testing: Mechanical properties of the resultant membranes were measured using an upgraded Instron mechanical property tester, model 1122, equipped with Testworks 4 data acquisition software (MTS Systems Corp., Minneapolis, Minn.). Specimens with the size of 85×5×0.5 mm (length×width×thickness) were tested at 21° C. and 65% relative humidity at the following settings: gauge length, 102 mm; strain rate, 50 mm/min. The properties measured included tensile strength (MPa), tensile modulus (MPa), maximal elongation (%), and toughness (J/cm$^3$).

Scanning Electron Microscopy Examination: For SEM examination, samples were coated with a thin layer of gold and characterized on a Quanta 200 SEM (FEG, FEI, Hillsboro, Oreg.). Images were collected with high-vacuum/secondary electron-imaging mode at magnifications of 250× and 2,500×. For samples containing pore-forming reagents and tested after immersing in aqueous solutions for 2-6 weeks, SEM examination was conducted following dehydration and freeze-fracture. Images of fracture surfaces were collected.

Antimicrobial Assay: Agar diffusion assay was used to determine the capability of Nisaplin® (both incorporated and in the free form) in suppressing/inhibiting the growth of a pathogenic bacteria, *L. monocytogenes* Scott A 724. The stock cultures were obtained from our in-house culture collection. Stock cultures were maintained at −80° C. in Brain Heart Infusion (BHI) broth (Difco Laboratory, Detroit, Mich.). Working cultures of *L. monocytogenes* were maintained on BHI agar at 4° C. and were sub-cultured bi-weekly and grown aerobically at 37° C. in BHI broth. Prior to inoculation of product, cultures were grown in BHI broth at 37° C. for 16-18 h.

A glass test tube containing testing specimens (0.18-0.20 g for each) was filled with 9 ml of BHI broth and inoculated with 1 ml of an overnight culture of *L. monocytogenes* (approximately 1×10$^3$ cells). The test tubes were shaken at 150 rpm at 22° C. At two time points, one at the beginning of the experiment and another at 24 h post experiment, aliquots containing 1 ml of incubated sample were serially diluted with sterile phosphate buffer (Hardy Diagnostics, Santa Maria, Calif.), then pour plated onto BHI agar. Plates were incubated at 37° C. for 24 h before counting the colony forming units (CFU).

To determine the time-dependent antimicrobial activity of membranes after their contact with the aqueous phase, the membranes containing pore forming reagents were immersed in release media (200 mg in 10 ml, solid/liquid) at room temperature with frequent and gentle shaking. After 4 weeks incubation, the membranes were taken out, rinsed with 5 ml fresh D.I. water 3 times, vacuum-dried for 24 hours, and then investigated for antimicrobial activity. The release media used in the present study were D.I. water for sodium chloride and sugar powder; fat-free milk for pectin, and 100% orange juice for Vitamin C.

Results and discussion: Membrane Preparations. Table 4 shows the effect of the inclusion of lactic acid on the rheological behavior of PLA preparations under processing conditions. The values of torque and ΔP were measures of the resistance of the polymers to screw rotation and the pressure drop along the slit capillary, respectively. The values reflected the viscoelastic properties of the samples. The higher the value, the more elastic the samples were. These values were a function of both composition and operating temperature. Without the addition of LA, the PLA samples existed as a melt at 160° C. However, when the temperature was reduced to 120° C. the PLA samples were surprisingly no longer in the melt state. The values of torque increased from 50 Nm to >200 Nm, and ΔP increased from 80 bar to >100 bar. At this temperature, the samples were too elastic to be extruded. With the addition of LA (5-10% of total mass), the PLA samples exhibited lower values of torque and ΔP at both 160° C. and 120° C. Although these values increased as the temperature was decreased, the samples were still viscous rather than elastic (ΔP value is less than 100 bar) at 120° C., and therefore surprisingly could be extruded. However, when the LA content was too high, for example, at about 20%, the samples had too low of a viscosity to be easily handled. Appropriate plasticizer contents could be further optimized for successful extrusion. Furthermore, the addition of inorganic compounds, NaCl, surprisingly had no discernable effect on the values of torque and pressure drop of the extruded PLA/LA blends under the experimental conditions used (Table 4). Similar results were surprisingly observed for other pore forming agents, such as pectin, vitamin C, and sugar powder (data not shown).

Figure 8:
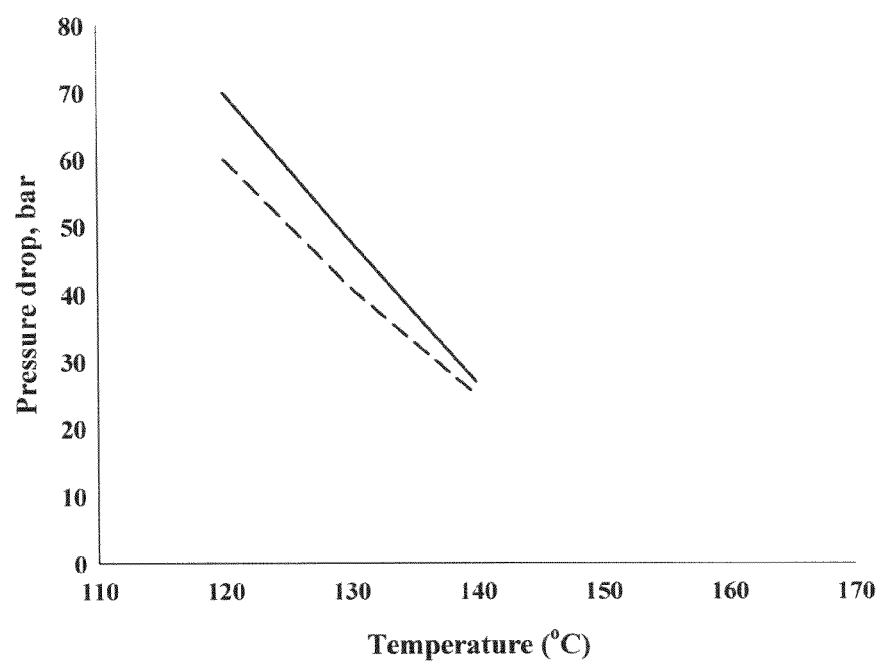
FIG. 8 shows effect of temperature on the reological properties of PLA blends containing 10% LA (solid line) or 20% LD (broken line) as described below.

The co-extrusion of LD or GTA with PLA also surprisingly reduced the viscosity of the samples. For the PLA blended with LD (10 w %) or GTA (20 w %), surprisingly the values of torque and ΔP decreased as the temperature increased, and the values of torque and ΔP at 120° C. were about 50 Nm and 30-50 bar, respectively (FIG. 8).

It was also noted that the mixtures of PLA and plasticizers in the barrel could surprisingly only maintain the lower values of torque and ΔP at 120° C. for a limited period, even when the temperature was maintained at this constant value. The length of the period was dependent on the nature and amount of the plasticizers used. In the case of LA, it was found to be about 7, 10, and 15 minutes for the polymers with LA contents of 5, 10, and 20%, respectively. It was observed that the mixtures became elastic at time periods longer than these. For the PLA blends with 10% LD or 20% GTA content, the time length was about 3-5 minutes. Therefore, Nisaplin® was fed into the extruder as soon as the barrel reached 120° C., before the PLA/LA became too elastic to process.

Changes in PLA Molecular Weight: As shown in Table 5, slightly lower values of $M_w$ and $M_n$ were recorded for PLA after extrusion. A significant decrease in values of $M_w$ and $M_n$ were surprisingly recorded for PLA/LA blends. The decrease in PLA molecular weight in the PLA/LA blends after melt processing could be further accelerated by the acid microenvironment that was created by the inclusion of LA monomers. The increase in $M_w/M_n$ of PLA indicated there were more short-chain PLA molecules in the blends than that in the neat PLA samples. Without being bound by theory, this may explain why there was a significant decrease in the values of torque and pressure drop, ΔP, during the co-extrusion of PLA and its monomer. On the other hand, the inclusion of LD or GTA was not as effective as the use of LA in altering the values of $M_w$, $M_n$, and $M_w/M_n$ of PLA in the blends. Without being bound by theory, this could be attributed to trans-esterifications occurring in the extrusion processing. The inclusion of sodium chloride particles surprisingly dramatically reduced the $M_w$, $M_n$, and increased the $M_w/M_n$ of PLA in the PLA/LA blends due to the residual moisture in the salts.

Figure 9:
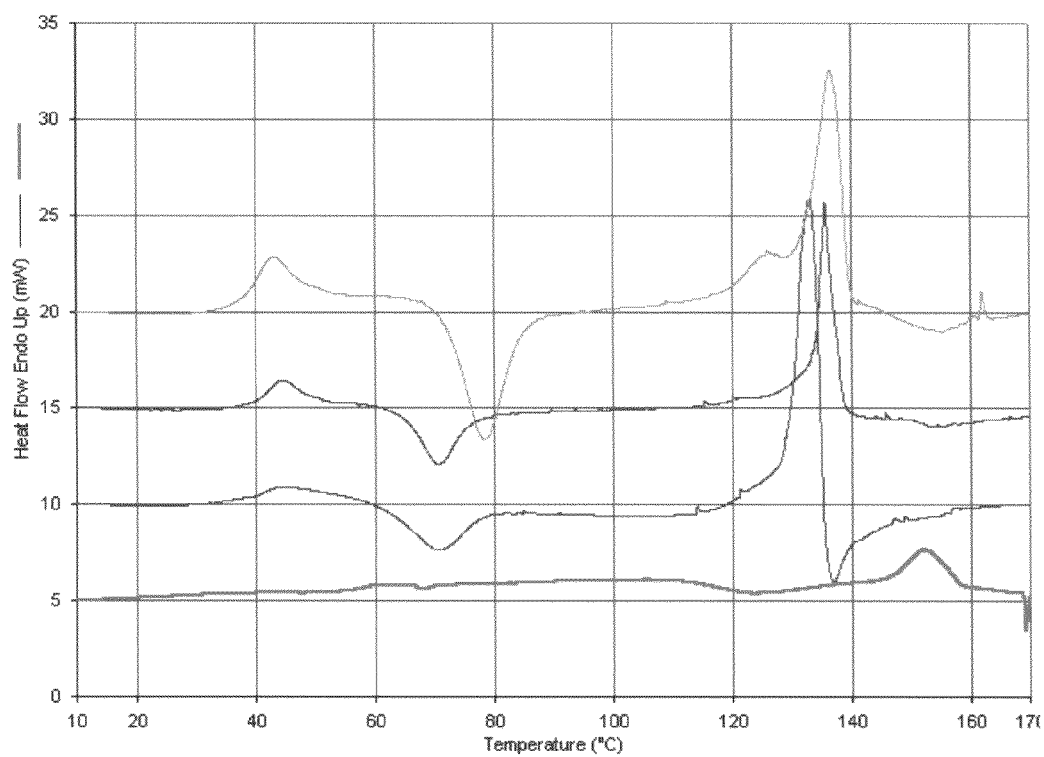
FIG. 9 shows DSC thermograms of extruded PLA and PLA blends as described below. From bottom to top: neat PLA, PLA/LA, PLA/LA/NaCl, PLA/LA/EDTA. The contents of LA and salt were 10% and 5%, respectively.
Figure 10:
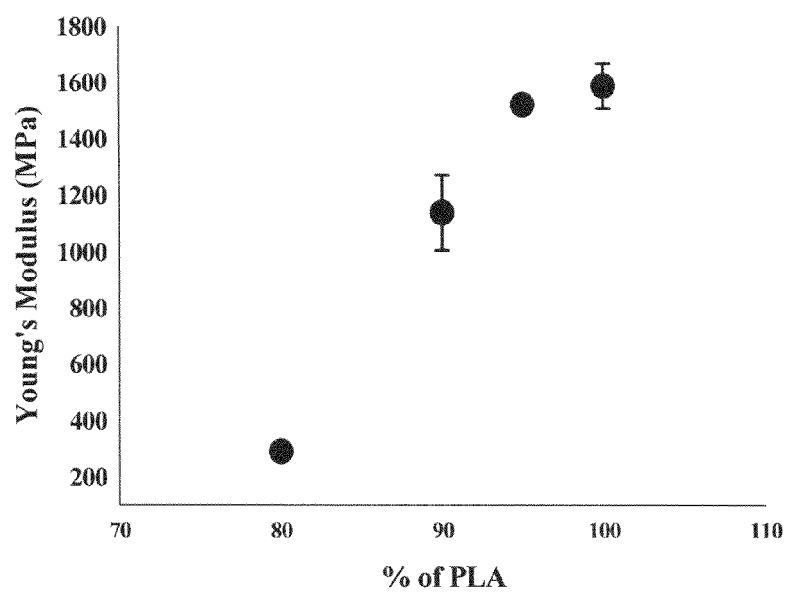
FIG. 10 shows 3A effect of GTA (glycerol triacetate) content on mechanical properties of PLA blends: (a) Young's modulus, (b) tensile strength, (c) maximal elongation, and (d) toughness as described below.
Figure 11:
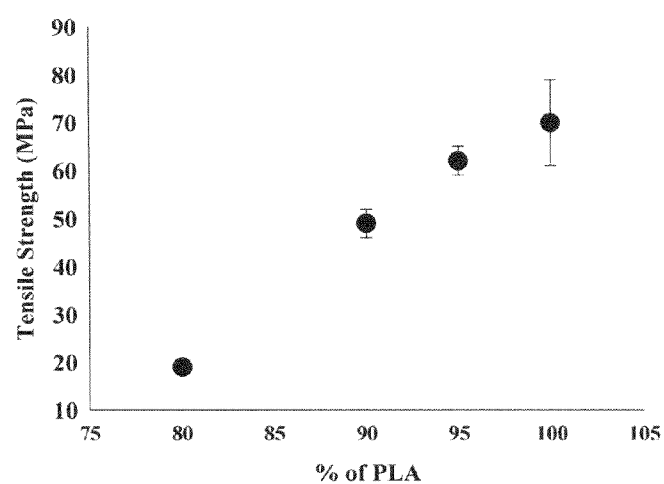
FIG. 11 shows 3B effect of GTA content on mechanical properties of PLA blends: (a) Young's modulus, (b) tensile strength, (c) maximal elongation, and (d) toughness as described below.
Figure 12:
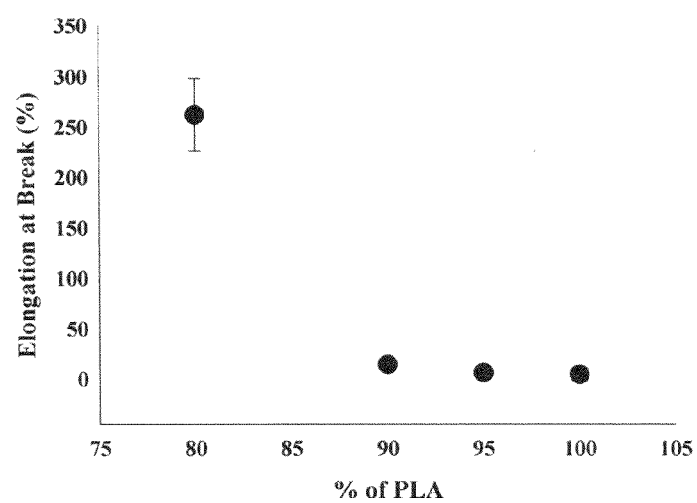
FIG. 12 shows 3C effect of GTA content on mechanical properties of PLA blends: (a) Young's modulus, (b) tensile strength, (c) maximal elongation, and (d) toughness as described below.
Figure 13:
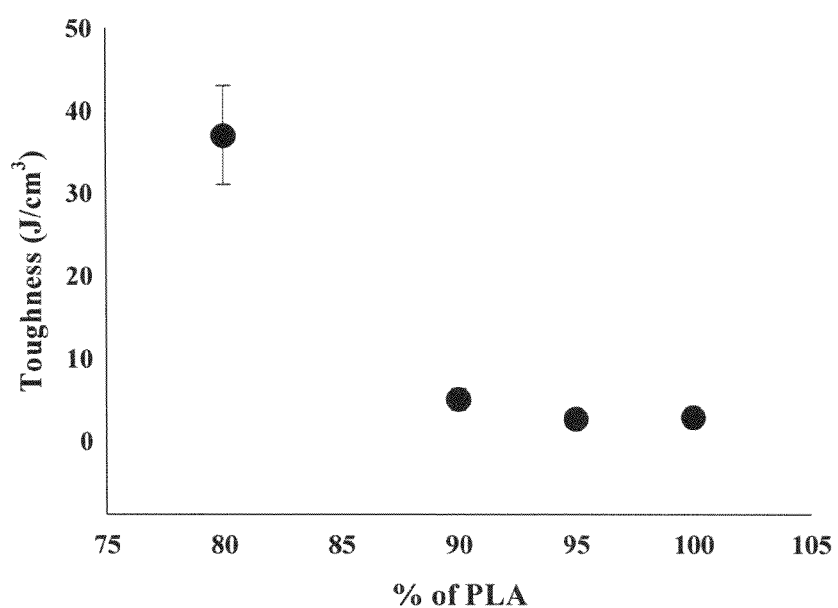
FIG. 13 shows 3D effect of GTA content on mechanical properties of PLA blends: (a) Young's modulus, (b) tensile strength, (c) maximal elongation, and (d) toughness as described below.

Thermal Properties Analysis: FIG. 9 shows the DSC thermograms of the extruded PLA and its plasticized blends. From the results of the first heat scan, the glass transition and the crystalline status of the test specimens were determined (Table 6). The glass transition temperature ($T_g$) and melting temperature ($T_m$) of PLA was found to be about 60° C. and 152° C., respectively. The addition of LA surprisingly reduced the of the resultant blends to about 130° C. The inclusion of LD or GTA surprisingly also showed a similar effect on the $T_m$ of the blends. The peak of each sample broadened toward lower temperatures, and the onset of the transition also moved toward lower temperature ranges. Correspondingly, the $T_g$ for each of the blends was also shifted to lower temperatures. In comparison of GTA with LA, more GTA than LA was needed to reduce the $T_g$ and $T_m$ of the blends to a similar level. Without being bound by theory, the lowering of the $T_g$ and $T_m$ of the blends could be attributed to the presence of short chain molecules (Table 5), that reduced the macromolecular interactions. These results were consistent with the reological properties of the blends measured during the extrusion experiments (Table 4). As the macromolecular interactions were weakened, it required more time for melted PLA chains to coalesce during extrusion (become elastic from viscous at 120° C.), and the "associated" macromolecules were easier to be disrupted during the DSC test (earlier onset time). Cold crystallization was observed for the extruded PLA and all blends. For the extruded neat PLA specimens, a slightly higher value of $\Delta H_m$ than $\Delta H_{cc}$ indicated that only minor crystallization might occur during the cooling following extrusion. The presence of plasticizers surprisingly seemed to slightly alter the crystalline structures of the blends. For the PLA/LD blends, the very similar value of $\Delta H_n$, and $\Delta H_{cc}$ suggested that the blends were primarily amorphous. The PLA/LA blends were able to crystallize during the cooling process, as suggested by the relatively large differences between $\Delta H_m$ and $\Delta H_{cc}$ and also for the PLA/GTA blends.

The inclusion of small particles, such as sodium chloride (Table 5), pectin, vitamin C, and sugar powder (data not shown), surprisingly also reduced the values of $T_g$ and $T_m$ but increased the crystallinity of the resultant blends, as suggested by the increase in the value of endotherm.

Measurements of Mechanical Properties: Adequate mechanical properties are very important for polymeric membranes designed for packaging purpose. Packaging materials are often subjected to mechanical stretching, where the membranes must be able to resist a considerable stress without fracture. The mechanical properties of resultant PLA membranes containing 10% LA or LD are shown in Table 7. The inclusion of LA and LD surprisingly reduced the tensile strength and Young's modulus of the PLA blends. The blends had less strength and less stiffness in comparison with membranes from neat PLA. Although blending PLA with LA or LD seemed to have no effect on the value of maximal elongation, the fractural energy of the blends was smaller than neat PLA membranes. Without being bound by theory, the lower mechanical properties could be attributed to lower interaction of PLA macromolecules by inserting small molecules. For the same reason, the mechanical properties of the PLA/LA and PLA/LD blends were further reduced by the inclusion of pore forming reagents.

FIGS. 10-13 show the effect of GTA amount on the mechanical properties of PLA blends. The inclusion of GTA into PLA surprisingly altered the brittle nature of PLA by increasing its flexibility, and thus the PLA/GTA blends were tougher than neat PLA specimens, which were expected because of the softening effect. The more GTA that was added, the more flexible and less strength in the blends. Although the inclusion of LA, LD, or GTA into PLA reduced the tensile strength of the resultant blends, the mechanical properties of the blends were surprisingly quite comparable with some petroleum-derived packaging materials, such as PVC (35 MPa) and PS (55 MPa), and PLA/pectin blends developed in our laboratory (40 MPa).

Figure 14:
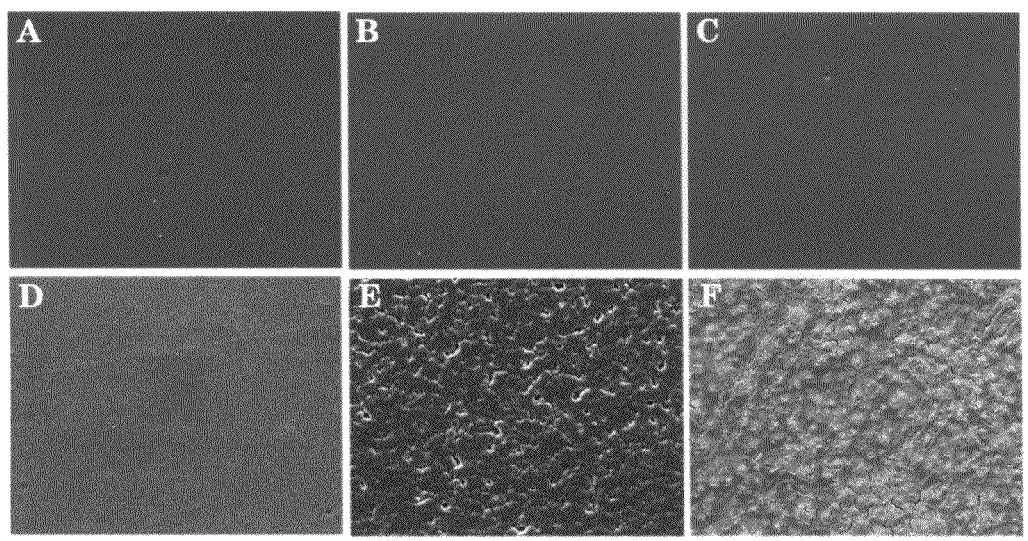
FIG. 14 shows SEM topographic images of extruded membranes of neat PLA (a) and PLA blends with LA (b), LD (c), and GTA (d), as well as PLA/LA blends containing NaCl (e), and containing the mixture of NaCl and Nisaplin® as described below. Field width: 136 μM.

Morphology: The SEM images of freshly extruded membranes are shown in FIG. 14. A homogeneous, smooth morphology was observed for neat PLA, and the blends of PLA/LA, PLA/LD, and PLA/GTA, indicating that the plasticizers and the PLA were surprisingly highly compatible. The co-extrusion of pore-forming reagents, such as sodium chloride, introduced a heterogeneous, craggy fractured surface. Pores could be clearly observed on the surfaces of the salt-containing composites. Without being bound by theory, the pores were possibly created by the air that adhered on the irregular surfaces of the salt particles. The air was separated from the carriers during extrusion, concentrated to form bubbles under the pressure by the rotating of the twin-screw, and then escaped, leaving void spaces. For the blends containing sodium chloride and Nisaplin®, the microparticles were evenly embedded in the continuous phase. The introduction of Nisaplin® also created pores of small sizes. Some heat sensitive components in the Nisaplin® might have degraded and "evaporated" at higher temperature and under higher pressure during extrusion, therefore, pores were created and particles were segregated.

Figure 15:
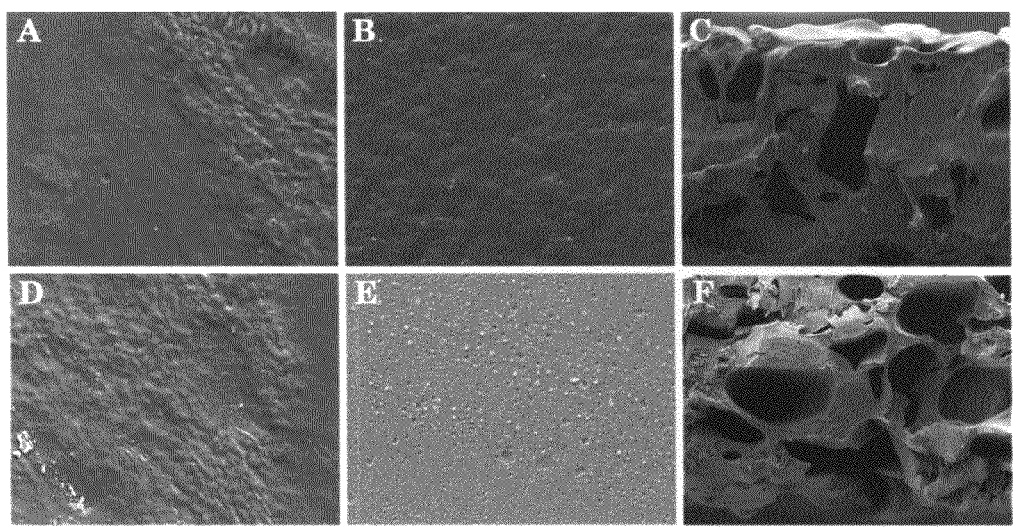
FIG. 15 shows SEM images of membranes from neat PLA (a, d) and the blends of PLA with LA (b, e), and LA/NaCl (c, f) after incubation in D.I. water for 4 weeks (a-c) or 6 weeks (d-f) at room temperature as described below. Field width: 54 μm (a, b, d, and e); 544 μm (c and f).

Bulk degradation may be the mechanism by which the degradation of PLA in aqueous solutions occurred randomly along the macromolecular chains at the edges or defects of the membrane surfaces. As a result, a rough morphology was created as the incubation time increased (FIG. 15a, and d). The inclusion of LA accelerated the PLA degradation (FIG. 15b, and e). At week 6, many small pores were created and randomly distributed through the whole surfaces. For the specimens containing salts that are soluble in water and can diffuse from the solid phase into the liquid phase, the fractured surfaces were investigated in order to obtain more information on structural changes. As seen on FIGS. 15c and f, pores were formed, and some were connected to form channels due to the release of embedded salt particles as the water migrated. With the increase in incubation time, the size and the number of the pores increased. The membranes, under higher magnification, "turned" to a thin scaffold in appearance. For practical reasons, the effect of other pore-forming reagents on membrane degradation was also examined. These pore-forming reagents were pectin, vitamin C, and sugar from sugar cane. The release media used for incubation with the membranes containing pectin, vitamin C, or sugar powders were fat-free milk, orange juice, and D.I. water, respectively. Membranes containing these pore-forming reagents also showed similar morphology before and after incubation as that observed for sodium chloride (data not shown).

As the membranes degraded and pores were created, one can reasonably believe that the incorporated Nisaplin® were leached out, consequently, the antimicrobial activity of the membrane should be simultaneously decreased. To clarify this presumption, the capability of the blend membrane in suppressing *L. monocytogenes* growth was investigated after incubation with release media.

Figure 16:
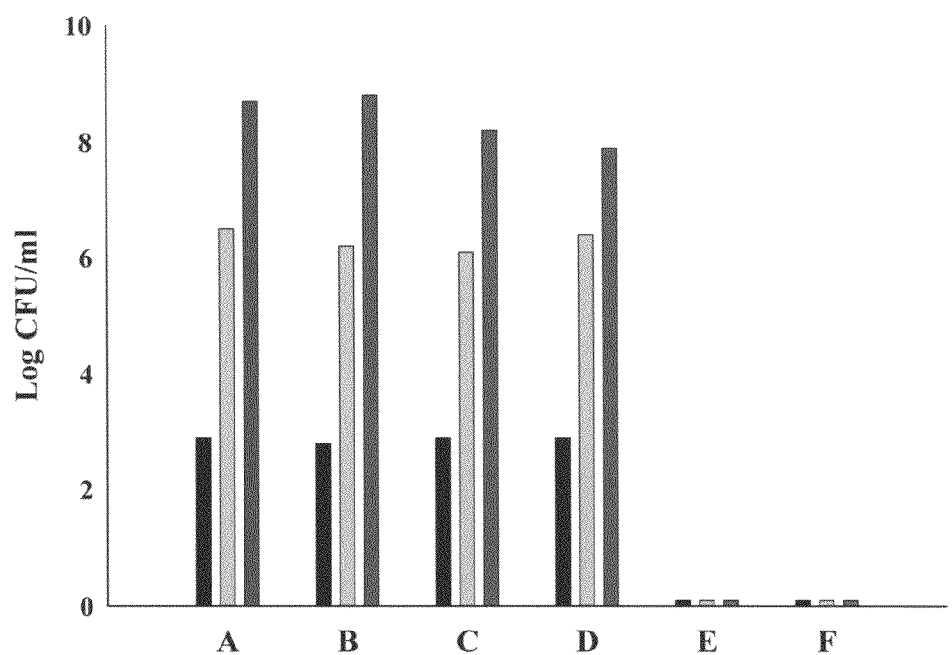
FIG. 16 shows Growth of *Listeria monocytogenes* in BHI broth in the presence of (A) PLA/Nisaplin®, (B) PLA, (C) PLA/LD, (D) PLA/GTA, (E) PLA/LD/Nisaplin®, and (F) PLA/GTA/Nisaplin® at room temperature as described below. For each type of membrane, the column (from left to right) stands for value of bacterial growth at the time when transferred to the agar, and after incubation for 24 and 48 hours, respectively.
Figure 17:
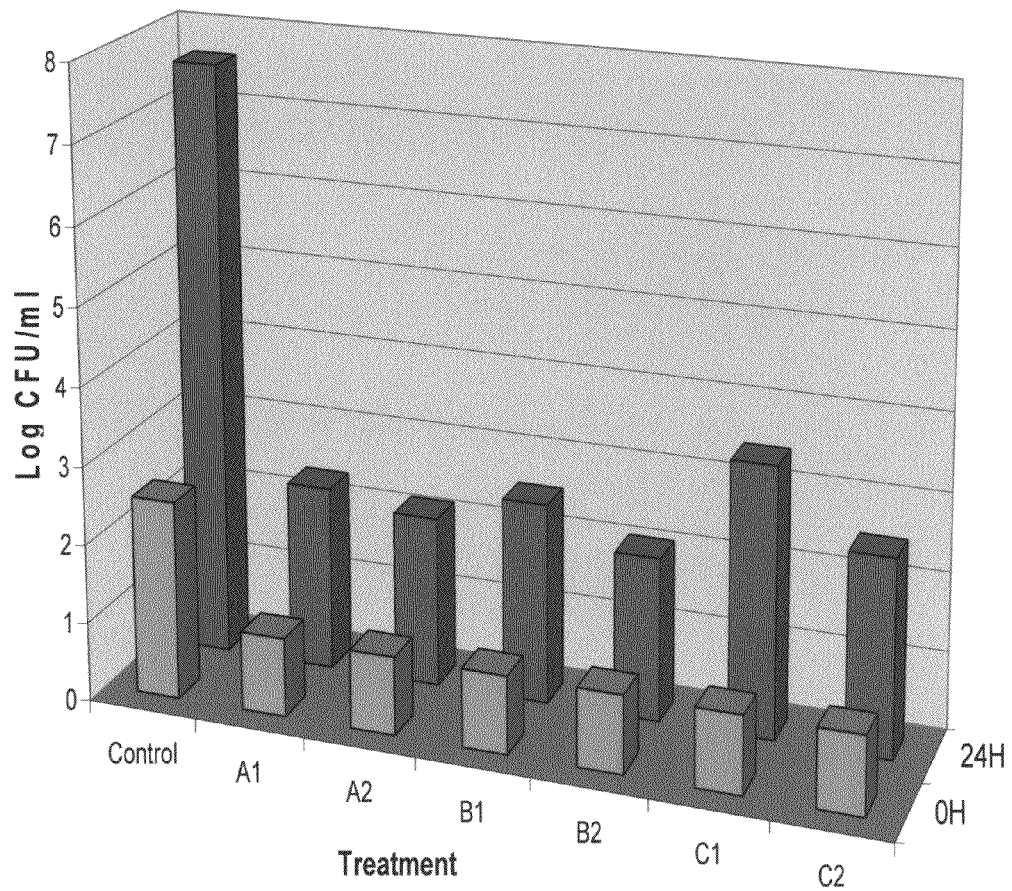
FIG. 17 shows Growth of *Listeria monocytogenes* in BHI broth in the presence of neat PLA and blends of PLA, LA, Nisaplin®, and the pore forming reagent, sodium chloride, at room temperature at the time when transferred to culture liquids (front raw) and 24 hours after incubation (back raw) as described below. Columns from left to right: Control: PLA; A1, B1, and C1: PLA/LA/Nisaplin® blends; A2, B2, and C2: PLA/LA/Nisaplin® blends containing 5% NaCl; A1 and A2: stored at 4° C. for 4 weeks; B1 and B2: stored at room temperature for 4 weeks; C1 and C2: pre-incubated in D.I. water at room temperature for 4 weeks.

Antimicrobial Activity: FIG. 16 shows antimicrobial activity of membranes prepared from neat PLA and the coextrusion of PLA and Nisaplin® at 160° C., as well as the blends prepared in the presence of LD or GTA. Bacterial growth in BHI was recorded for all Nisaplin®-free membranes (samples B, C, and D). No difference could be seen in bacterial growth in BIH between the neat PLA (sample B) and PLA/Nisaplin® (sample A) prepared at 160° C., indicating the deactivation of Nisaplin® in the absence of plasticizers. In contrast, bacterial growth was surprisingly prevented in BHI broth inoculated with *L. monocytogenes* in the presence of PLA/LD (sample E) and PLA/GTA (sample F) blend membranes containing Nisaplin®. Furthermore, surprisingly no bacterial recovery could be detected after culture for 24 and 48 hours, demonstrating significant antimicrobial activity of the Nisaplin® co-extruded with PLA in the presence of LD or GTA under present experimental conditions. Membranes prepared by co-extrusion of PLA, LA and Nisaplin® also surprisingly showed excellent antimicrobial activity by suppressing the growth of *Listeria monocytogenes* (FIG. 17). After being stored at room temperature for 4 weeks, the membranes still maintained the antimicrobial activity. The results also indicated that the antimicrobial activity was independent of the influence of storage temperature in the range studied.

We then investigated the antimicrobial activity of PLA/LA/Nisaplin® membranes after incubation in D.I. water for 4 weeks. The membranes were surprisingly able to maintain the activity as *L. monocytogenes* growth was suppressed (compare the C group to the control). The inclusion of a pore-forming reagent, sodium chloride, surprisingly enhanced the antimicrobial activity of the blend membrane as one can see by comparison samples C2 to C1, or the C group to B group. Sample C1 seemed to be less active than sample B1 and B2, while sample C2 was almost as active as B1 and B2. Without being bound by theory, this was because the Nisaplin incorporated on the C1 surface area might be washed out by water incubation while those incorporated beneath the surfaces of C1 membranes would take time to diffuse to the liquid phase. After water incubation, less Nisaplin® in C1 than in B1 and B2 were available to inhibit bacterial growth. When a pore-forming reagent was incorporated (sample C2), the pores and channels surprisingly facilitated the release of the incorporated Nisaplin®, therefore, more Nisaplin® would be available on C2 surfaces in the BHI solution.

Finally, we investigated the antimicrobial activity of the PLA/LA/Nisaplin®membranes containing other pore-forming reagents, such as powders of pectin, Vitamin C, and sugar after being incubated in various media for 4 weeks. As shown in Table 8, all testing membranes were surprisingly active.

Results from the present research showed that antimicrobial membranes of PLA and Nisaplin® could be surprisingly prepared simply by co-extrusion of the two in the presence of plasticizers, such as LA, LD, or GTA without losing bioactivity. The resultant membranes surprisingly possessed mechanical properties that match some commercially available petroleum-derived plastics. The inclusion of pore forming reagents surprisingly accelerated the Nisaplin® release, and surprisingly improved the antimicrobial activity of the membranes under the present experimental conditions.

Example 3

Materials: Poly(lactic acid) (PLA) with a weight-average molecular weight of 135 KDa and polydispersity index of 1.28 was obtained from NatureWorks (Minnetonka, Minn.). The PLA pellets were ground into microparticles with a size of about 300 μm. Glycerol triacetate (GTA) and ethylenediamine-tetraacetic acid, disodium salt (EDTA) were purchased from Sigma-Aldrich (Milwaukee, Wis.). Nisaplin® was purchased from Danisco Cultor USA (New Century, Kans.).

Blend preparation: PLA, plasticized PLA, and their blends with EDTA-Nisaplin® in the form of strands or thin membranes were prepared using a HAAKE MiniLab II Rheomex CTW5 bench-top twin-screw extruder (ThermoFisher Scientific, Newington, N.H.). The extruder employed two co-rotating conical screws (109.5 mm in length, and 5 and 14 mm in diameter at the die and rear ends, respectively), and had a bypass channel which allowed materials to be either recycled or directly extruded through the use of a "cycle/flush" valve. To determine the flow behavior of samples, the back channel was constructed as a rheological slit capillary with two pressure sensors. The rheological measurements, torque and ΔP, were a function of both composition and operating temperature, reflecting the resistance of the polymers to screw rotation and the pressure drop along the slit capillary. The higher the value, the more elastic the samples were. The extruder was connected with and operated by a computer equipped with operation/analysis software (Polylab Monitor Software, version 4.1.7).

PLA and a designated amount of plasticizers, 5-30% of the total weight, were mixed mechanically in a glass vial. A fraction of the mixture was first added to the extruder using a pneumatic feeder. The extruder was operated at 160° C. at the beginning, with the unit set to recycle mode. After the PLA was melted, the barrel temperature was then set to 120° C. When this temperature was reached, EDTA-Nisaplin® (5 w % of total mass) was added and the extrusion was continued. For membrane preparation, a slit die (5 mm in width and 0.5 mm in thickness) was attached to the exit.

Microscopic analysis: Scanning electron microscopy (SEM) and confocal laser microscopy (CLM) were used for morphology examination. For SEM, samples were vacuum-dried for 48 hrs prior to investigation. The dried samples (5×7 mm) were mounted onto specimen stubs and sputter coated with a thin layer of gold. SEM images of topographical features of the membrane were collected using a Quanta 200 FEG environmental scanning electron microscope (FEI Co. Inc., Hillsboro, Oreg.) operated in the high vacuum/secondary electron imaging mode at an acceleration voltage of 10 KV. For CLM, images were obtained by confocal fluorescence for Nisaplin® (ex/em, 488/530 nm) and confocal reflection for PLA (633 nm) in two separate channels using an IRBE optical microscope with a 10× lens integrated with a Model TCS-SP laser scanning confocal microscope (Leica Microsystems, Exton, Pa.). The distribution of Nisaplin® and PLA was visualized in sets of optical sections extending from the surface to deep (~30 μm) within the blends.

Thermal analysis: Differential scanning calorimetry (DSC) was performed on extruded samples. The samples were crimp sealed in 40 μl stainless steel pans. All samples were first scanned from 20 to 200° C. at the heating rate of 10° C./min, then held at 200° C. for 20 minutes, cooled to 20° C. at 10° C./min, kept at 20° C. for 10 minutes, and heated to 200° C. again. Tests were run in triplicate for each sample, and the results were averaged. Data on glass transition temperature ($T_g$), melting temperature ($T_m$), crystallization temperature ($T_c$), and melting enthalpy ($\Delta H_n$) of the samples were collected. Crystallinity, was calculated, according to the formula $X_c=(\Delta H_m/\Delta H°_m)\times(100/w)$ where $\Delta H_m$ designated the measured enthalpy of melting, and $\Delta H°_m$ was the enthalpy for 100% crystalline polymer. For, PLA, $\Delta H°_m$=93.6 J/g. The letter w represented the mass fraction of PLA in the blends (Wong, S., et al., Polym. Eng. & Sci., 43: 1566 (2003)).

Dynamic mechanical analysis: Dynamic mechanical analysis was performed using a Rheometrics RSA II analyzer (Piscataway, N.J.). Each sample was equilibrated in the sample chamber under nitrogen at −100° C. prior to running the test. Temperature was increased at a heating rate of 10° C./min. Storage modulus (E') and loss modulus (E") were measured as a function of temperature. Data were collected from −100° C. to 100° C. and analyzed using Rheometric Scientific Orchestrator software, version 6.5.7. A nominal strain of 0.1% was used with an applied frequency of 10 rad/s (1.59 Hz). The average data were calculated based on 3 specimens for each sample.

Mechanical testing and acoustic emission: All samples were conditioned at 23° C. and 50% relative humidity for 7 days prior to testing. Specimens were then characterized for tensile strength, stiffness and toughness by the use of an upgraded Instron mechanical property tester, model 1122 (Instron Corp., Norwood, Mass.) with a gauge length of 60 mm and a strain rate at 50 mm/min. The Testworks 3.1 data station and analysis software (MTS Systems Corp., Minneapolis, Minn.) were used throughout this work. Tests for each sample were performed five times to obtain an average value.

Acoustic emission (AE) analysis was performed simultaneously with the mechanical testing. A small transducer (10 mm in diameter, 20 g in weight; Model R15, Physical Acoustics Corp., Princeton Junction, N.J.) was clipped against the sample specimen. The transducer resonated at 150 KHz. As the samples were stretched, the AE signals emanating from this transducer were processed with a Model 1220A preamplifier and an upgraded LOCAN-AT acoustic emission analyzer (Physical Acoustics Corp., Princeton Junction, N.J.), which was connected to a PC with enhanced graphing and data acquisition software.

Antimicrobial activity test: The pathogenic bacteria *Escherichia coli* O157:H7 Oklahoma used for stock cultures was obtained from the culture collection of the U.S. Department of Agriculture, Agricultural Research Service, Eastern Regional Research Center.

Each glass test tube, containing 0.18~0.20 g of PLA sample, was filled with 9 ml of Tryptic Soy Broth (TSB) and inoculated with 1 ml of an overnight culture of *Escherichia coli* O157:H7 Oklahoma (approximately $1\times10^3$ cells). The test tubes were shaken at 150 rpm at 22° C. Cell populations (CFU: colony forming unit) were determined at 0, 24 and 48 hrs. Aliquots containing 1 ml of incubated sample were serially diluted with sterile phosphate buffer (Hardy Diagnostics, Santa Maria, Calif.), then pour plated onto tryptic Soy agar. Plates were incubated at 37° C. for 24 h before counting. Film-free inoculated medium served as a control. All tests were performed in duplicate.

Results and Discussion: GTA plasticized PLA containing EDTA-Nisaplin® particles was extruded for the examination of structural properties and antimicrobial activity. Table 9 shows the rheological properties of PLA with different GTA contents under the present processing conditions. For the PLA samples without the addition of GTA, as the operating temperature decreased from 160° C. to 120° C., the measured rheological parameter, torque, increased from 49 Ncm to >200 Ncm. Another parameter, ΔP, also increased from 80 bar to >100 bar. Consequently, the physical state of the samples gradually changed from predominately viscous (at 160° C.) to highly elastic (at 120° C.), and finally became so elastic that extrusion was not possible. With the inclusion of GTA, the PLA/GTA blends surprisingly exhibited lower values of torque and ΔP even at the lower temperatures. As more GTA was blended with the PLA, the values of the rheological properties of the blends surprisingly became lower. When GTA content was over 20 wt %, the blends showed appropriate viscoelastic properties at 120° C. (torque<40 Ncm), where the EDTA-Nisaplin® was added to the extruder and the extrusion was continued. The addition of solid EDTA-Nisaplin® particles to the blends slightly increased the values of torque and ΔP. However, with a higher GTA content, plasticized PLA containing EDTA-Nisaplin® surprisingly could easily be prepared. At the GTA content of 30 wt %, the blends surprisingly could also be made directly at 110° C., having a ΔP value ranging from 25 to 45 bar.

The organization and microstructure of PLA membranes and the blend membranes are shown in FIGS. 18 and 19. The SEM micrographs showed smooth topography for all samples tested (FIGS. 18a-d). However, the PLA and plasticized PLA membranes had smoother surface characters than the membranes containing EDTA, or EDTA-Nisaplin®. The inclusion of Nisaplin® and EDTA showed an even deposition of the protein/salt particles into the matrix phase, and introduced bright marbling characteristics to the blend surfaces. This phenomenon was further evaluated by CLM (FIG. 19), where the PLA and GTA components were determined by confocal reflection at 633 nm colored red; while the protein components were measured by confocal fluorescence at 488/500-550 nm (excitation/emission), colored green. For the blend membranes, green particles of Nisaplin® compositions were surprisingly evenly distributed within the PLA matrix phase, indicating a well-mixed, integrated structure. The Nisaplin® particles were in the size range from 250 nm to 20 μm.

The thermal properties of PLA and GTA blends with different ratios are shown in Table 10. It can be seen that the $T_g$ of all plasticized PLA blends were surprisingly lower than that of the neat PLA. The crystallization and melting temperatures are also shown in Table 10. Significant decreases in $T_c$ and $T_m$ surprisingly can only be seen for the PLA plasticized with greater than 10 wt % GTA. Without being bound by theory, this could be attributed to the high crystallinity of PLA ($X_c$=0.58) used in this study. Only a large amount of plasticizer resulted in the remarkable decrease in both $T_c$ and $T_m$. For the PLA with 30 wt % GTA, the value $T_c$ and $T_m$, surprisingly were 31° C. and 50° C. respectively lower than the neat PLA. As the crystallization took place later upon cooling from the melt, the crystallinity of the plasticized PLA with higher GTA contents were surprisingly also significantly lower than that for neat PLA.

Table 11 shows the effect of the inclusion of GTA on the thermal properties of PLA blends containing EDTA-Nisaplin®. In comparing neat PLA with the PLA containing EDTA-Nisaplin®, no difference in the $T_g$ could be observed. This indicated that the molecular mobility of the PLA chains was less affected by the inclusion of EDTA-Nisaplin® particles. Without being bound by theory, this could be attributed to poor interfacial bonding between the fillers and the matrix. However, the $T_g$ of the plasticized PLA (GTA content, 30 wt %) surprisingly was increased from 41° C. to 52° C. by the inclusion of EDTA-Nisaplin®, implying a "bridge effect" of the GTA coated on the particle surfaces that was expected to enhance the surface interaction between the particles and the PLA. The "bridge effect" restricted the flexibility of the PLA macromolecules. The $T_c$ of the unplasticized PLA containing EDTA-Nisaplin® was higher than that of the neat PLA ($T_c$=114° C. and 110° C. for the blends with or without particles, respectively), indicating that the EDTA particles may, without being bound by theory, function as a nucleating reagent when the PLA crystallizes from melt state. This phenomena was not observed for the plasticized PLA containing EDTA-Nisaplin® ($T_c$=79° C. and 78° C. for plasticized PLA with or without EDTA-Nisaplin® particles, respectively), indicating that the GTA may, without being bound by theory, coat on the surfaces of EDTA particles, thus inhibiting the crystallization of PLA from the particles. The crystallinity of the PLA containing EDTA-Nisaplin® was slightly increased in comparison with the neat PLA samples. Without being bound by theory, this could be attributed to the increase of the so that an earlier crystallization may result in a higher degree of crystallinity when the blends were cooled from the melt state. The presence of the plasticizer surprisingly dramatically reduced the crystallinity of the PLA-EDTA-Nisaplin®.

The mechanical properties of PLA, plasticized PLA and plasticized PLA containing EDTA-Nisaplin® particles are shown in Table 12. In general, the blend of GTA with PLA surprisingly resulted in a decrease in Young's modulus and tensile strength, and an increase in the value of breaking elongation of the obtained plasticized polymers. The toughness of the plasticized PLA also increased due to the enhanced flexible property. Furthermore, the inclusion of EDTA and Nisaplin® into the blends reduced the mechanical properties of the plasticized blends. The polymeric membranes became less flexible than the plasticized PLA. Without being bound by theory this could be attributed to a "filler effect" of the included particles. This supports the DSC findings shown in Table 10.

Figure 20A:
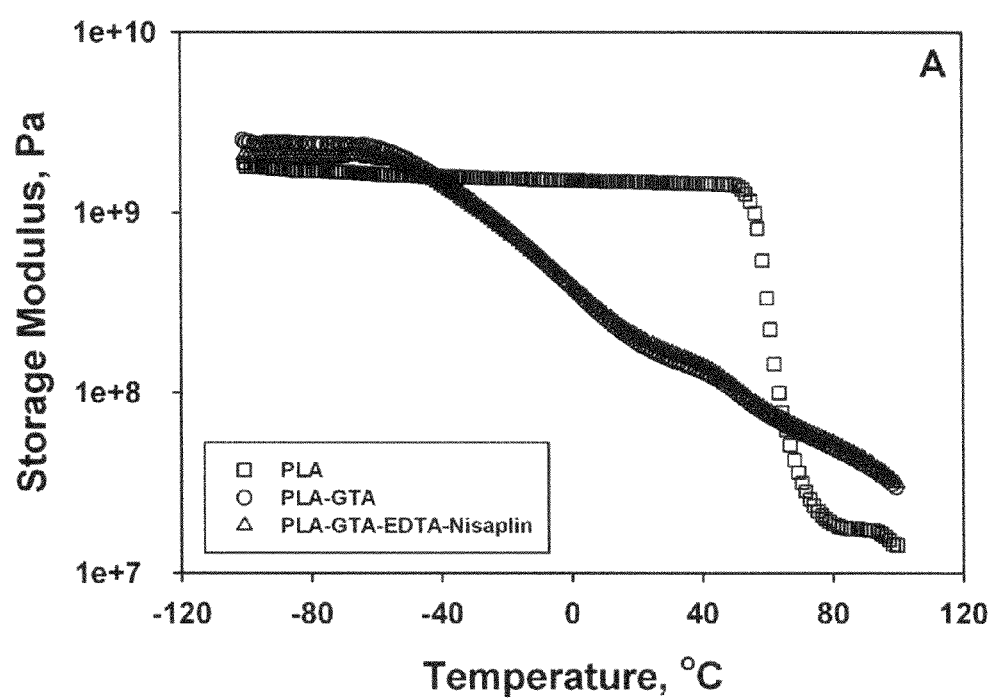
FIG. 20 shows typical plots of (A) storage modulus and (B) loss modulus as functions of temperature: (□) neat PLA, (○) plasticizer PLA, (▲) plasticized PLA containing EDTA-Nisaplin® as described below.
Figure 20B:
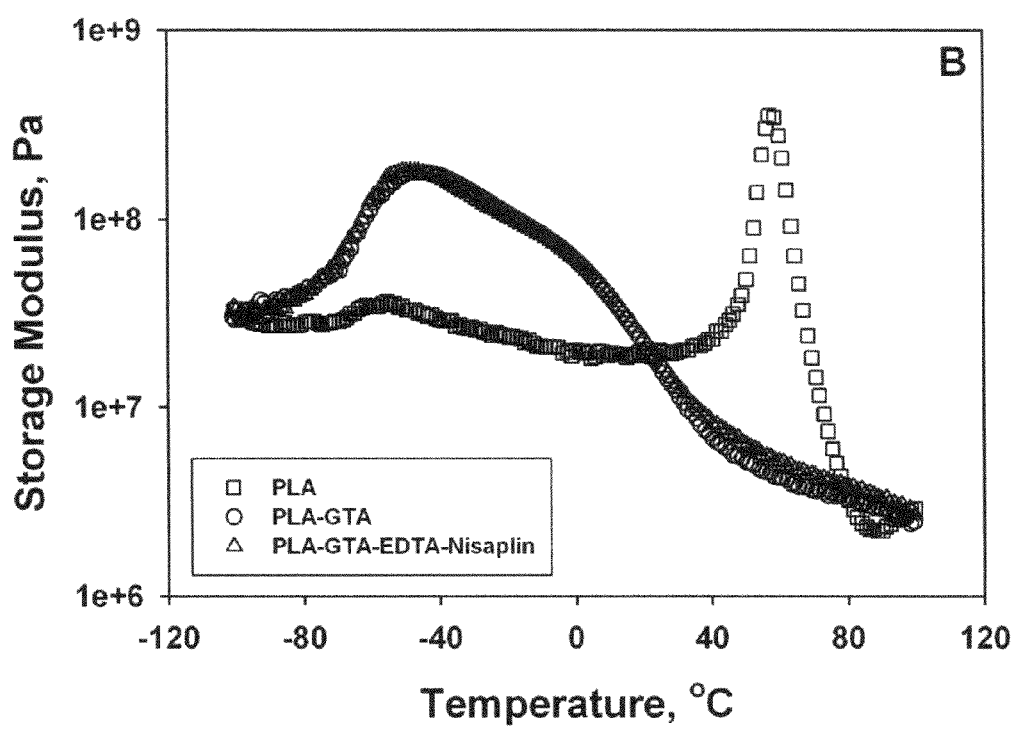

The DMA curves for PLA, PLA/GTA blends, as well as the PLA containing GTA and Nisaplin®-EDTA are shown in FIG. 20a (Storage Modulus, E') and FIG. 20b (Loss Modulus, E"). The initial storage modulus of PLA showed a flat curve from −100 to about +55° C. It also had a sharp glass transition at about +55° C. Above the $T_g$, the stress in the PLA sample rapidly decreased to the point that there was essentially no force reading on the instrument. The overall trends for the plasticized PLA curve were similar to that for the plasticized PLA containing EDTA and Nisaplin® particles. Both the plasticized blends surprisingly had a higher value for the storage modulus than the neat PLA over the temperature range from −100 to −45° C., then showed a continuing gradual decline in E' throughout the remaining temperature range investigated. The $T_g$ values measured for the plasticized samples were similar to those obtained by DSC. In contrast to the neat PLA curve, the storage modulus above the $T_g$ was still significant for the plasticized samples. Without being bound by theory, this could be attributed to the higher content (30%) of plasticizer in the blends studied here. Furthermore, without being bound by theory, the decrease in $T_g$ and $X_c$ of the blends may be the reason for the reduction in the E' value for the plasticized PLA and PLA-EDTA-Nisaplin® blends in the intermediate temperature range.

For the E" curves, both of the plasticized samples surprisingly showed similar trends that were significantly different from neat PLA. The most noticeable observation was that a broader E" peak was recorded for each plasticized blend at the temperature range from −60 to about +30° C. Without being bound by theory, these may result from induced second order transitions. In this temperature range, the E" values for the plasticized samples were also higher than for neat PLA. Without being bound by theory, it appeared that the inclusion of GTA raised the stiffness of the PLA at lower temperature, while reducing the mechanical properties at higher temperature, from about +30° C. to the $T_g$. These results were considered to be the contribution of the GTA below its $T_m$ of 3° C. At the lower temperature, the coupling of GTA to PLA chains tended to limit the mobility of the macromolecules.

AE emission was used to probe the deformation of the blends caused by an external force. The deformation of a blend (as it was squeezed, torn or stretched) was accompanied by a rapid movement, relocation, or breaking of structural elements such as fillers, fibers, matrices, and their interfacial areas. As a result, sound waves were produced that were detected by an acoustic transducer and converted into electronic signals. This basic phenomenon was defined as an acoustic emission event and was translated by an AE analyzer as a "hit". AE measurements were made simultaneously during tensile stress-strain tests for all sample specimens.

Figure 21C:
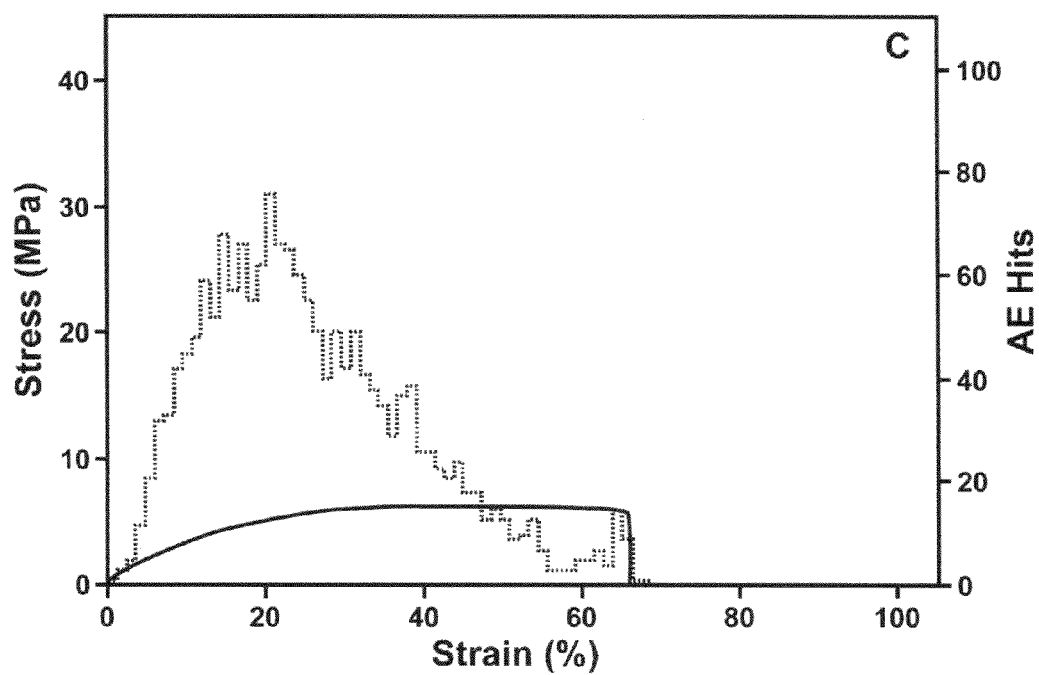
FIG. 21 shows correlation of stress-strain curve (solid line) and AE emission curve (dotted line): (A) neat PLA, (B) plasticized PLA, and (C) plasticized PLA containing EDTA-Nisaplin® as described below.

FIG. 21 shows the correlation between the stress-strain curve and strain-AE hit rate pattern of the non-plasticized PLA, and plasticized PLA containing with or without EDTA- Nisaplin® particles. For those prepared without EDTA-Nisaplin®, regardless of the content of GTA, all samples behaved as linear elastic materials and were characterized with a major peak of AE event (FIGS. 21a and b). When the samples were stretched, both the stress and strain increased simultaneously. A series of low intensity AE events were also recorded along with the stretch. However, the sharp peak of AE activity occurred at the maximum elongation at which the samples were stretched to break. These observations indicated the homogeneous structures of the PLA and plasticized PLA. For the samples prepared from PLA, GTA, and EDTA-Nisaplin®, the stress-strain profile was surprisingly similar to that of the plasticized PLA; while the AE-hit curves were totally different. As shown in FIG. 21c, the AE emission had a different feature. AE was emitted at the very beginning of the stretch, followed by a steep increase and then a slower decrease which continued to the end of the process. This character reflected the heterogeneous structure of the blends (FIGS. 18 and 19) and indicated the poor adhesion of the particles to the matrix. This resulted in a peak of AE emission that occurred during the process, at strain levels ranging from 18% to 25% of the original length, not at the end of stretch. Without being bound by theory, this may be attributed to the low particle content (5 wt %) embedded in the matrix phase of the blends. The stretch caused debonding of the particle from the matrix; when most particles were pulled out, the matrix phase was still in a continuous state, and was able to sustain some degree of the force.

Figure 22:
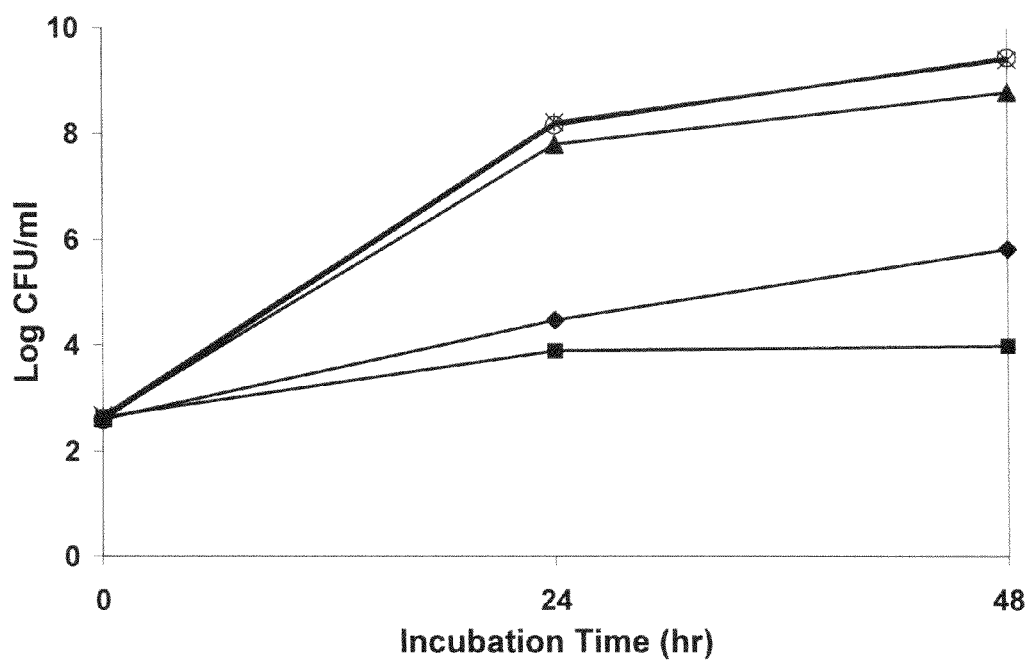
FIG. 22 shows antimicrobial effect of EDTA-Nisaplin® on PLA membranes (○) control, (x) plasticized PLA membranes, (▲) plasticized PLA with Nisaplin®, (♦) plasticized PLA with EDTA, and (■) plasticized PLA with EDTA-Nisaplin® as described below.

Antimicrobial activity test: FIG. 22 shows the growth curves of *E. coli* O157 in TSB medium during 48 hr incubation at 22° C. There was no difference in microbial counts between PLA membranes and the control at 0, 24 and 48 hr incubation time, indicating PLA alone did not contribute any antimicrobial activity against *E. coli* O157:H7. PLA membranes with antimicrobials significantly reduced the growth of *E. coli* O157:H7 during the incubation. Among them, the inclusion of EDTA-Nisaplin® had the greatest effect and membranes containing Nisaplin® had the least effect on the reduction of *E. coli* O157:H7 populations. Our data in this study showed that the effect of the inclusion of EDTA-Nisaplin® was significantly greater than that of each preservative used alone. Therefore, a synergistic effect clearly played a role in preventing growth of the pathogen.

Conclusions: The use of plasticized PLA films containing both EDTA and Nisaplin® should be quite effective at preventing growth of representative Gram positive and negative bacteria in model systems.

All of the references cited herein, including U.S. patents, are incorporated by reference in their entirety. Also incorporated by reference in their entirety are the following references: U.S. Pat. No. 7,066,995; Amash, A., and P. Zugenmaier, Polymer, 41: 1589 (2000); Auras, R., et al., Micromol. Biosci., 4: 835 (2004); Blackburn, P., et al., 1989, Nisin compositions for use as enhanced, broad range bacteriocins, Patent Application No. PCT/US89/02625, Publication No. WO89/12399; Callister, W. D., Materials Science and Engineering, 5th ed., Wiley & Sons, New York, 2000, pp. 800-801; Chen, F., et al., Ind. Eng. Chem. Res., 47: 8667-8675 (2008); Delves-Broughton, J., Food Australia, 57: 525-520 (2005); Hauffe, N., Trends and opportunities in packaging R&D in the US: technology review, Tekes, Helsinki, Finland, 2007; Hurst, A., Adv. Appl. Microbiol., 27: 85 (1981); Larsen, T., Incorporation of nisin into corn-zein film, M.S. thesis, 1995, Clemson University, Clemson, S.C.; Ray, B., and M. Daeschel, Food biopreservatives of microbial origins, pages 204-207, CRC Press, Inc., Boca Raton, Fla., 1992.

Thus, in view of the above, the present invention concerns (in part) the following:

A composition comprising (or consisting essentially of or consisting of) poly(lactic acid), at least one bacteriocin, and at least one plasticizer, and optionally at least one pore forming agent. The composition may also contain EDTA.

The above composition, wherein said composition is produced by a method comprising (or consisting essentially of or consisting of) mixing said poly(lactic acid) and said at least one plasticizer and optionally at least one pore forming agent at a first temperature of about 150°-about 170° C. to form a mixture, cooling said mixture to a second temperature of about 115°-about 125° C., adding at least one bacteriocin to said mixture and mixing to form said composition.

The above composition, wherein said composition is produced by a method comprising (or consisting essentially of or consisting of) mixing said poly(lactic acid) and said at least one plasticizer and optionally at least one pore forming agent at a first temperature of about 150°-about 170° C. for about 2-about 4 minutes to form a mixture, cooling said mixture to a second temperature of about 115°-about 125° C., adding at least one bacteriocin to said mixture and mixing for about 1-about 3 minutes to form said composition.

The above composition, wherein said second temperature is about 115°-about 120° C.

The above composition, wherein said composition is produced by a method comprising (or consisting essentially of or consisting of) mixing said poly(lactic acid) and said at least one plasticizer and optionally at least one pore forming agent in an extruder at a first temperature of about 150°-about 170° C. for about 2-about 4 minutes, cooling said extruder to a second temperature of about 115°-about 125° C., adding at least one bacteriocin to said extruder and mixing for about 1-about 3 minutes, to form said composition.

The above composition, wherein said second temperature is about 115°-about 120° C.

The above composition, wherein said composition is produced by a method comprising (or consisting essentially of or consisting of) mixing said poly(lactic acid) and said at least one plasticizer and optionally at least one pore forming agent in an extruder at a first temperature of about 150°-about 170° C. for about 3 minutes, cooling said extruder to a second temperature of about 115°-about 125° C., adding at least one bacteriocin to said extruder and mixing for about 2 minutes, to form said composition.

The above composition, wherein said at least one bacteriocin is nisin.

The above composition, wherein said at least one plasticizer is selected from the group consisting of lactic acid, lactide, triacetin, glycerol triacetate, and mixtures thereof.

The composition, wherein said at least one plasticizer is lactic acid.

The above composition, wherein said at least one plasticizer is lactide.

The above composition, wherein said at least one plasticizer is triacetin.

The above composition, wherein said at least one plasticizer is glycerol triacetate.

The above composition, wherein said at least one pore forming agent is selected from the group consisting of salt, pectin, sugar, vitamin C, and mixtures thereof. The above composition, wherein said at least one pore forming agent is salt. The above composition, wherein said at least one pore forming agent is pectin. The above composition, wherein said at least one pore forming agent is sugar. The above composition, wherein said at least one pore forming agent is vitamin C.

The above composition, wherein said composition contains about 70-about 95 wt % of said poly(lactic acid), about 0.1-about 5 wt % of said at least one bacteriocin, and about 5-about 25 wt % of said at least one plasticizer.

The above composition, wherein said composition contains about 7.5-about 15 wt % of said at least one plasticizer.

The above composition, wherein said composition contains about 2-about 15 wt % of said at least one pore forming agent.

The above composition according to claim 1, wherein said composition is produced by a method comprising (or consisting essentially of or consisting of) mixing about 100% of the total of said poly(lactic acid), about 50%- about 90% of the total of said at least one plasticizer, and optionally at least one pore forming agent at a first temperature of about 150°-about 170° C. to form a mixture, cooling said mixture to a second temperature of about 115°-about 125° C., adding at least one bacteriocin and about 10%- about 50% of the total of said at least one plasticizer and the remainder of the total of said poly(lactic acid) to said mixture and mixing to form said composition.

A film produced from the above composition.

A molded article produced from the above composition.

A method of making a composition, said composition comprising (or consisting essentially of or consisting of) poly(lactic acid), at least one bacteriocin, and at least one plasticizer, and optionally at least one pore forming agent, said method comprising (or consisting essentially of or consisting of) mixing about 100% of the total of said poly(lactic acid), about 50%- about 90% of the total of said at least one plasticizer, and optionally at least one pore forming agent at a first temperature of about 150°-about 170° C. to form a mixture, cooling said mixture to a second temperature of about 115°-about 125° C., adding at least one bacteriocin and about 10%- about 50% of the total of said at least one plasticizer and the remainder of the total of said poly(lactic acid) to said mixture and mixing to form said composition.

A method of making a composition, said composition comprising (or consisting essentially of or consisting of) poly(lactic acid), at least one bacteriocin, and at least one plasticizer, and optionally at least one pore forming agent, said method comprising (or consisting essentially of or consisting of) mixing said poly(lactic acid) and said at least one plasticizer and optionally at least one pore forming agent at a first temperature of about 150° to about 170° C. to form a mixture, cooling said mixture to a second temperature of about 115° to about 125° C., adding at least one bacteriocin to said mixture and mixing to form said composition.

A method of protecting food products from bacteria, comprising (or consisting essentially of or consisting of) wrapping the food products in the above film or placing the food products in the above molded article.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

TABLE 1

Effect of LA on the Rheological Behaviors of PLA Composites

| LA Content | Stage I, at 160° C. | | Stage II, at 120° C. | |
|---|---|---|---|---|
| (%) | Torque (Nm) | ΔP (bar) | Torque (Nm) | ΔP (bar) |
| 0 | 49 | 81 | >200 | >100 |
| 10 | 14 | 11 | 24 | 27 |
| 5 | 10 | 9 | 29 | 35 |
| 5 + 5* | 10 | 9 | 57 | 6 |
| 7.5 | 6 | 6 | 16 | 15 |
| 7.5 + 2.5* | 6 | 6 | 67 | 38 |
| 14.5 | 1 | 1 | | |
| 14.5 + 5.5* | 1 | 1 | 1 | 1 |

*Number with the star symbol indicates the LA amount (% of total mass) added into the barrel with Nisaplin ® after PLA melted.
ΔP = pressure drop

TABLE 2

Effect of Plasticizers on the Thermal Properties of PLA Membranes

| Compositions | $T_g$ °C. | Exotherm | | | Endotherm | | |
|---|---|---|---|---|---|---|---|
| | | Onset °C. | Max °C. | ΔH J/g | Onset °C. | Max °C. | ΔH J/g |
| 100% PLA | 60 | — | — | — | 120 | 152 | 23.3 |
| 80% PLA, 20% LD | 25 | 75 | 87 | −17.3 | 108 | 132 | 19.6 |
| 90% PLA, 10% LA | 41 | 62 | 71 | −9.3 | 114 | 133 | 48.6 |
| 85% PLA, 10% LA +5% NaCl | 41 | 65 | 71 | −16.1 | 115 | 136 | 35.3 |
| 85% PLA, 10% LA +5% EDTA | 41 | 72 | 78 | −22.0 | 106 | 137 | 32.0 |

Plasticizers: LA (lactic acid); LD (lactide); TA (glycerol triacetate)

TABLE 3

Compositions of PLA/Nisaplin ® Composite Membranes

| Sample ID | Stage I, at 160° C. | | | Stage II, at 120° C. | |
|---|---|---|---|---|---|
| | PLA | Plasticizer (g) | NaCl | Plasticizer (g) | Nisaplin ® |
| 1 | 5.50 | 0 | 0 | N/A | |
| 2 | 4.625 | LA, 0.625 | 0 | LA, 0.20 | 0.055 |
| 3 | 4.40 | LD, 0.845 | 0 | LD, 0.255 | 0.055 |
| 4 | 4.625 | TA, 0.625 | 0 | TA, 0.20 | 0.055 |
| 5 | 4.40 | LA, 0.625 | 0.275 | LA, 0.20 | 0.055 |
| 6 | 3.85 | LA, 0.625 | 0.825 | LA, 0.20 | 0.055 |

Plasticizers: LA (lactic acid); LD (lactide); TA (glycerol triacetate)

TABLE 4

Effect of LA on the Rheological Behavior of PLA/LA Blends

| PLA/LA (w/w) | Stage I, at 160° C. | | Stage II, at 120° C. | |
|---|---|---|---|---|
| | Torque (Nm) | ΔP (bar) | Torque (Nm) | ΔP (bar) |
| 100/0 | 49 | 81 | >200 | >100 |
| 95/5 | 10 | 9 | 49 | 45 |
| 92.5/7.5 | 6 | 6 | 36 | 38 |
| 90/10 | 14 | 11 | 24 | 27 |
| 80/20 | 1 | 1 | 3 | 2 |
| 95/5 (+5% NaCl) | 10 | 9 | 47 | 46 |

TABLE 5

Effect of Plasticizer on PLA Molecular Weight

| Plasticizers | $M_w$ | $M_n$ | $M_w/M_n$ |
|---|---|---|---|
| PLA* | 135,000 | 98,000 | 1.38 |
| PLA | 121,000 | 83,000 | 1.46 |
| PLA/LA (90:10) | 87,500 | 35,000 | 2.50 |
| PLA/LD (90:10) | 97,500 | 62,500 | 1.56 |
| PLA/GTA (90:10) | 108,000 | 76,800 | 1.41 |
| PLA/GTA (80:20) | 105,500 | 79,000 | 1.34 |
| PLA/LA (95/5) + 5% NaCl | 75,000 | 31,050 | 2.41 |

*Determined before extrusion.

TABLE 6

Effect of Plasticizers on the Thermal Properties of PLA Membranes

| | Exotherm | | | Endotherm | |
|---|---|---|---|---|---|
| Compositions | $T_g$ (°C.) | $T_{cc}$ (°C.) | $\Delta H_{cc}$ (J/g) | $T_m$ (°C.) | $\Delta H_m$ (J/g) |
| 100% PLA | 58 | 110 | −16.9 | 152.4 | 21.9 |
| 90% PLA, 10% LA | 41 | 71 | −9.3 | 133 | 48.6 |
| 90% PLA, 10% LD | 45 | 87 | −17.3 | 132 | 19.6 |
| 90% PLA, 10% GTA | 55 | 102 | −14.2 | 146 | 27.6 |
| 85% PLA, 15% GTA | 49 | 94 | −12.4 | 134 | 30.2 |
| 80% PLA, 20% GTA | 43 | 82 | −10.1 | 128 | 29.5 |
| 85% PLA, 10% LA + 5% NaCl | 41 | 71 | −16.1 | 136 | 35.3 |

Plasticizers: LA (lactic acid); LD (lactide); GTA (glycerol triacetate)

TABLE 7

Effect of plasticizers and sodium chloride on the Mechanical Properties of Blends of PLA containing LA, or LD

| Plasticizers and salt | Tensile Strength, MPa | Elongation at Break, % | Young's Modulus, MPa | Toughness J/cm³ |
|---|---|---|---|---|
| PLA, 100% | 70.2 ± 9.3 | 4.3 ± 1.2 | 1588 ± 80 | 2.8 ± 1.0 |
| +LA, 10% | 40.6 ± 2.4 | 4.1 ± 1.0 | 1115 ± 78 | 1.8 ± 0.9 |
| +LD, 10% | 53.3 ± 4.5 | 4.41 ± 1.1 | 1237 ± 99 | 2.1 ± 0.4 |
| +LA, 10%, and NaCl, 5% | 29.6 ± 7.1 | 2.1 ± 0.2 | 1762 ± 94 | 1.3 ± 0.4 |

TABLE 8

Survival of *L. monocytogenes* in brain heart infusion broth at 22° C.

| Incubation time (hours) | Neat PLA membrane | PLA membrane containing Nisaplin ® and | | |
|---|---|---|---|---|
| | | pectin | Vitamin C | Sugar |
| 0 (initial) | 2.45* | ND** | ND | ND |
| 24 after initial | 7.59 | ND | ND | ND |
| 48 after initial | 8.09 | ND | ND | ND |

*Log colony forming unit per ml.
**not detected (<1 colony forming unit per ml).

TABLE 9

Effect of GTA on the Rheological Behavior of PLA/LA Blends

| | Stage I, at 160° C. | | Stage II, at 120° C. | |
|---|---|---|---|---|
| % GTA, w/w | Torque, Ncm | ΔP, bar | Torque, Ncm | ΔP, bar |
| 0 | 49 | 81 | >200 | >100 |
| 5 | 40 | 49 | 79 | 75 |
| 10 | 36 | 42 | 66 | 68 |
| 20 | 24 | 21 | 42 | 44 |
| 30 | 11 | 17 | 33 | 27 |
| 30 & (5% EDTA +5% Nisaplin ®) | 19 | 22 | 47 | 39 |

TABLE 10

Thermal Properties of PLA with different GTA contents

| % GTA | $T_g$ (°C.) | $T_c$ (°C.) | $T_m$ (°C.) | $\Delta H_m$ (J/g) | $X_c$ (%) |
|---|---|---|---|---|---|
| 0 | 58 | 110 | 165 | 54.2 | 57.9 |
| 5 | 57 | 108 | 158 | 43.6 | 49.0 |
| 10 | 55 | 102 | 152 | 38.6 | 45.8 |
| 15 | 49 | 94 | 134 | 32.2 | 40.5 |
| 20 | 43 | 82 | 128 | 26.2 | 35.0 |
| 30 | 41 | 79 | 115 | 19.6 | 29.9 |

TABLE 11

Effect of GTA on the thermal Properties of PLA containing Nisaplin ®-EDTA

| % GTA | $T_g$ (°C.) | $T_c$ (°C.) | $T_m$ (°C.) | $\Delta H_m$ (J/g) | $X_c$ (%) |
|---|---|---|---|---|---|
| 0 | 58 | 114 | 169 | 54.2 | 61.0 |
| 30 | 52 | 78 | 116 | 15.8 | 26.0 |

TABLE 12

Mechanical properties of PLA and its blends

| Composition | Tensile Strength, MPa | Young's Modulus, MPa | Elongation at Break, % | Fracture Energy, J/cm³ |
|---|---|---|---|---|
| 100% PLA | 40.2(1.5) | 868(59) | 6.2(0.6) | 1.6(0.2) |
| 30% GTA | 7.3(0.4) | 40.1(2.1) | 108.5(17.7) | 5.4(1.2) |
| 30% GTA + (5% EDTA & 5% Nisapline) | 6.6(0.2) | 41.2(2.5) | 62.5(15.9) | 3.4(1.1) |

We claim:

1. A composition comprising poly(lactic acid), at least one bacteriocin, and at least one plasticizer, and optionally at least one pore forming agent; wherein said composition is produced by a method comprising mixing about 100% of the total of said poly(lactic acid), about 50% to about 90% of the total of said at least one plasticizer and optionally at least one pore forming agent at a first temperature of about 150° to about 170° C. to form a mixture, cooling said mixture to a second temperature of about 115° to about 125° C. adding at least one bacteriocin and about 10% to about 50% of the total of said at least one plasticizer and the remainder of the total of said poly(lactic acid) to said mixture and mixing to form said composition.

2. The composition according to claim 1, wherein said composition is produced by a method comprising mixing about 100% of the total of said poly(lactic acid) and about 50% to about 90% of the total of said at least one plasticizer and optionally at least one pore forming agent at a first temperature of about 150° to about 170° C. for about 2 to about 4 minutes to form a mixture, cooling said mixture to a second temperature of about 115° to about 125° C., adding at least one bacteriocin and about 10% to about 50% of the total of said at least one plasticizer and the remainder of the total of said poly(lactic acid) to said mixture and mixing for about 1 to about 3 minutes to form said composition.

3. The composition according to claim 1, wherein said second temperature is about 115' to about 120° C.

4. The composition according to claim 1, wherein said composition is produced by a method comprising mixing about 100% of the total of said poly(lactic acid) and about 50% to about 90% of the total of said at least one plasticizer and optionally at least one pore forming agent in an extruder at a first temperature of about 150° to about 170° C. for about 2 to about 4 minutes, cooling said extruder to a second temperature of about 115° to about 125° C., adding at least one bacteriocin and about 10% to about 50% of the total of said at least one plasticizer and the remainder of the total of said poly(lactic acid) to said extruder and mixing for about 1 to about 3 minutes, to form said composition.

5. The composition according to claim 4, wherein said second temperature is about 115' to about 120° C.

6. The composition according to claim 4, wherein said composition is produced by a method comprising mixing about 100% of the total of said poly(lactic acid) and about 50% to about 90% of the total of said at least one plasticizer and optionally at least one pore forming agent in an extruder at a first temperature of about 150° to about 170° C. for about 3 minutes, cooling said extruder to a second temperature of about 115° to about 125° C., adding at least one bacteriocin and about 10% to about 50% of the total of said at least one plasticizer and the remainder of the total of said poly(lactic acid) to said extruder and mixing for about 2 minutes, to form said composition.

7. The composition according to claim 1, wherein said at least one bacteriocin is nisin.

8. The composition according to claim 1, wherein said at least one plasticizer is selected from the group consisting of lactic acid, lactide, triacetin, glycerol triacetate, and mixtures thereof.

9. The composition according to claim 1, wherein said at least one plasticizer is lactic acid.

10. The composition according to claim 1, wherein said at least one plasticizer is lactide.

11. The composition according to claim 1, wherein said at least one plasticizer is triacetin.

12. The composition according to claim 1, wherein said at least one pore forming agent is selected from the group consisting of salt, pectin, sugar, vitamin C, and mixtures thereof.

13. The composition according to claim 1, wherein said composition contains about 70 to about 95 wt % of said poly(lactic acid), about 0.1 to about 5 wt % of said at lease one bacteriocin, and about 5 to about 25 wt % of said at least one plasticizer.

14. The composition according to claim 1, wherein said composition contains about 7.5 to about 15 wt % of said at least one plasticizer.

15. The composition according to claim 1, wherein said composition contains about 2 to about 15 wt % of said at least one pore forming agent.

16. A film or molded article produced from the composition according to claim 1.

17. A method of making a composition, said composition comprising poly(lactic acid), at least one bacteriocin, and at least one plasticizer, and optionally at least one pore forming agent, said method comprising mixing about 100% of the total of said poly(lactic acid), about 50% to about 90% of the total of said at least one plasticizer, and optionally at least one pore forming agent at a first temperature of about 150° to about 170° C. to form a mixture, cooling said mixture to a second temperature of about 115° to about 125° C. adding at least one bacteriocin and about 10% to about 50% of the total of said at least one plasticizer and the remainder of the total of said poly(lactic acid) to said mixture and mixing to form said composition.

18. The method according to claim 17, wherein said method comprises mixing about 100% of the total of said poly(lactic acid) and about 50% to about 90% of the total of said at least one plasticizer and optionally at least one pore forming agent at a first temperature of about 150° to about 170° C. for about 2 to about 4 minutes to form a mixture, cooling said mixture to a second temperature of about 115° to about 125° C., adding at least one bacteriocin and about 10% to about 50% of the total of said at least one plasticizer and the remainder of the total of said poly(lactic acid) to said mixture and mixing for about 1 to about 3 minutes to form said composition.

19. The method according to claim 18, wherein said second temperature is about 115° to about 120° C.

20. The method according to claim 17, wherein said method comprises mixing about 100% of the total of said poly(lactic acid) and about 50% to about 90% of the total of said at least one plasticizer and optionally at least one pore forming agent in an extruder at a first temperature of about 150° to about 170° C. for about 2 to about 4 minutes, cooling said extruder to a second temperature of about 115° to about 125° C., adding at least one bacteriocin and about 10% to about 50% of the total of said at least one plasticizer and the remainder of the total of said poly(lactic acid) to said extruder and mixing for about 1 to about 3 minutes, to form said composition.

21. The method according to claim 20, wherein said second temperature is about 115° to about 120° C.

22. The method according to claim 20, wherein said method comprises mixing about 100% of the total of said poly(lactic acid) and about 50% to about 90% of the total of said at least one plasticizer and optionally at least one pore forming agent in an extruder at a first temperature of about 150° to about 170° C. for about 3 minutes, cooling said extruder to a second temperature of about 115° to about 125° C., adding at least one bacteriocin and about 10% to about 50% of the total of said at least one plasticizer and the remainder of the total of said poly(lactic acid) to said extruder and mixing for about 2 minutes, to form said composition.

23. The composition according to claim 1, wherein said composition comprises poly(lactic acid), at least one bacteriocin, at least one plasticizer, and at least one pore forming agent.

* * * * *